(12) United States Patent
Olorode et al.

(10) Patent No.: US 12,124,374 B2
(45) Date of Patent: *Oct. 22, 2024

(54) SERVICING CPU DEMAND REQUESTS WITH INFLIGHT PREFETCHES

(71) Applicant: TEXAS INSTRUMENTS INCORPORATED, Dallas, TX (US)

(72) Inventors: Oluleye Olorode, Garland, TX (US); Ramakrishnan Venkatasubramanian, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,482

(22) Filed: Nov. 15, 2022

(65) Prior Publication Data

US 2023/0078414 A1 Mar. 16, 2023

Related U.S. Application Data

(63) Continuation of application No. 16/775,479, filed on Jan. 29, 2020, now Pat. No. 11,500,777, which is a
(Continued)

(51) Int. Cl.
*G06F 12/0862* (2016.01)
*G06F 9/38* (2018.01)
(Continued)

(52) U.S. Cl.
CPC ........ *G06F 12/0862* (2013.01); *G06F 9/3806* (2013.01); *G06F 9/3838* (2013.01);
(Continued)

(58) Field of Classification Search
CPC ............ G06F 12/0862; G06F 12/0215; G06F 12/0881; G06F 12/1027; G06F 9/3806; G06F 9/3838
See application file for complete search history.

(56) References Cited

U.S. PATENT DOCUMENTS 6,012,134 A   1/2000  McInerney et al.
6,523,093 B1* 2/2003  Bogin ................. G06F 12/0862
                                                          711/213
(Continued)

OTHER PUBLICATIONS

Extended European Search report for EP 18866633.3 dated Nov. 26, 2020.
(Continued)

*Primary Examiner* — Baboucarr Faal
(74) *Attorney, Agent, or Firm* — Brian D. Graham; Frank D. Cimino; Xianghui Huang

(57) ABSTRACT

Disclosed embodiments provide a technique in which a memory controller determines whether a fetch address is a miss in an L1 cache and, when a miss occurs, allocates a way of the L1 cache, determines whether the allocated way matches a scoreboard entry of pending service requests, and, when such a match is found, determine whether a request address of the matching scoreboard entry matches the fetch address. When the matching scoreboard entry also has a request address matching the fetch address, the scoreboard entry is modified to a demand request.

20 Claims, 12 Drawing Sheets

Related U.S. Application Data continuation of application No. 16/279,721, filed on Feb. 19, 2019, now Pat. No. 10,558,578, which is a continuation of application No. 15/730,893, filed on Oct. 12, 2017, now Pat. No. 10,210,090.

(51) Int. Cl.
  *G06F 12/02* (2006.01)
  *G06F 12/0871* (2016.01)
  *G06F 12/1027* (2016.01)

(52) U.S. Cl.
  CPC ...... *G06F 12/0215* (2013.01); *G06F 12/0871* (2013.01); *G06F 12/1027* (2013.01); *G06F 2212/6022* (2013.01)

(56) References Cited

U.S. PATENT DOCUMENTS

| | | |
|---|---|---|
| 6,718,454 B1 | 4/2004 | Ebner |
| 7,600,078 B1 | 10/2009 | Cen et al. |
| 2002/0144054 A1 | 10/2002 | Fanning et al. |
| 2006/0265552 A1 | 11/2006 | Davis et al. |
| 2012/0030431 A1 | 2/2012 | Anderson et al. |
| 2012/0072667 A1 | 3/2012 | Anderson et al. |
| 2014/0229719 A1 | 8/2014 | Smeets et al. |
| 2014/0281248 A1 | 9/2014 | Alameldeen et al. |
| 2016/0019151 A1 | 1/2016 | Venkatasubramanian et al. |
| 2017/0344483 A1 | 11/2017 | Shwartsman et al. |
| 2018/0121200 A1 | 5/2018 | Chou et al. |

OTHER PUBLICATIONS

Extended European Search Report for 23200726.0, dated Mar. 13, 2024.

* cited by examiner

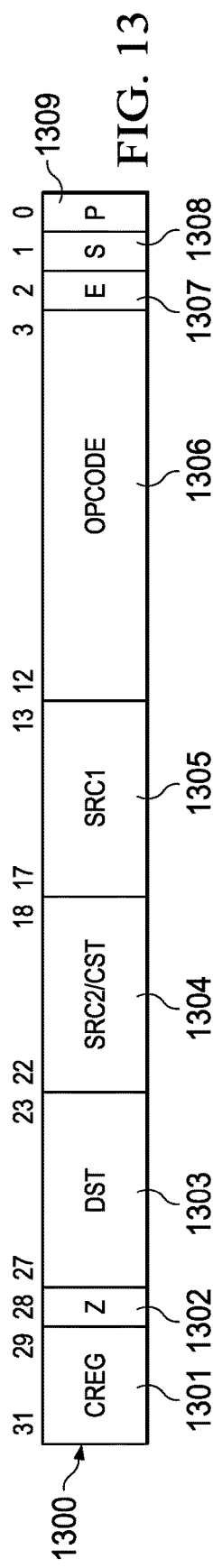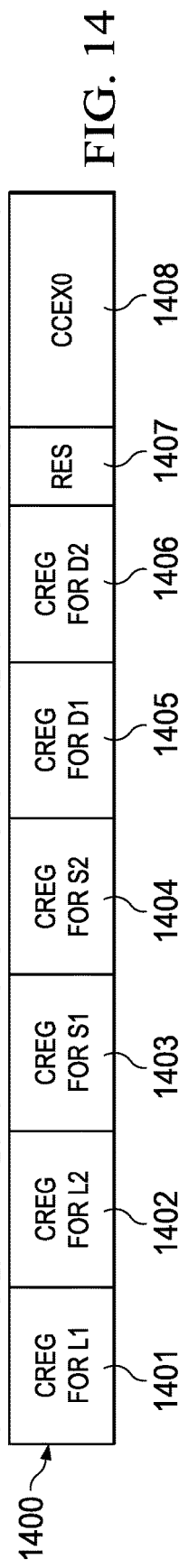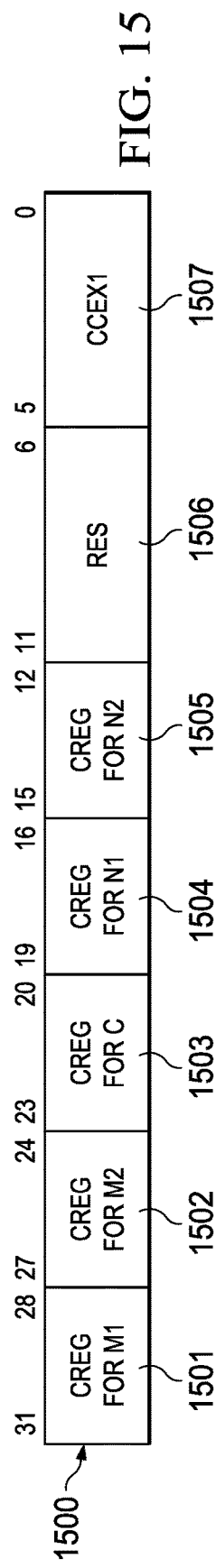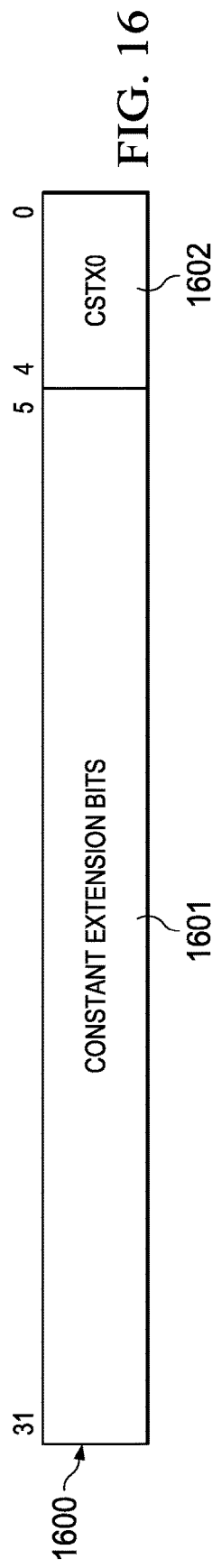

SERVICING CPU DEMAND REQUESTS WITH INFLIGHT PREFETCHES

CROSS-REFERENCE TO RELATED APPLICATION(S)

This application is a continuation of U.S. patent application Ser. No. 16/775,479, filed Jan. 29, 2020, which is a continuation of U.S. patent application Ser. No. 16/279,721, filed on Feb. 19, 2019, now U.S. Pat. No. 10,558,578, which is a continuation of U.S. patent application Ser. No. 15/730,893, filed on Oct. 12, 2017, now U.S. Pat. No. 10,210,090, each of which is incorporated by reference herein in its entirety.

TECHNICAL FIELD

The technical field of this invention is digital data processing and more specifically improvements in cache operation.

BACKGROUND

Currently digital data processers operate on very fast clocks and typically execute instructs faster than they can be recalled from generic memory. A known solution to the problem of providing instructions to the digital data processors is known as instruction cache. The digital data processing system provides a small, fast memory in physical and computational proximity to the data elements that require instruction control. This small, fast memory stores a subset of the instructions required. Digital data processors often work on loops. If all or most of an instruction loop is stored in the cache, the digital data processor can be kept fed with instructions at a rate faster than recall from generic memory.

As a result of these cache schemes it has become helpful to determine what instructions will be employed ahead of the actual need. Such a prefetch enables the cache anticipate the need for instructions. Prefetched instruction may already be stored in the cache when needed.

There are some problems with many prefetch techniques. In particular a demand fetch by the CPU may occur while a prefetch for the same instruction is pending.

BRIEF SUMMARY

This invention involves a cache system in a digital data processing apparatus. The digital data processing apparatus includes: a central processing unit core; and a level one instruction cache. The central processing unit core performs data processing operations in response to program instructions. The central processing unit core issues instruction requests for additional program instructions when needed via a request address. The level one instruction cache temporarily stores a subset of program instructions in level one cache lines. When the central processing unit requests an instruction at a request address, the level one instruction cache determines whether it stores the instruction at the request address. If so, the level one instruction cache supplies the requested program instructions. If not, the level one instruction cache supplies the request address to another memory for cache service.

The central processing unit core includes a branch predictor which predicts the taken/not taken state of program branches. Upon an instruction request, the branch predictor calculates and supplies an instruction count of a number of linearly following instructions to be requested after an instruction access before a branch is predicted to be taken off the linear path.

A prefetch unit receives the instruction request address and the instruction count. The prefetch unit sequentially generates cache prefetch requests for instructions linearly following the requested instruction up to the instruction count.

A program memory controller determines whether the level one instruction cache stores requested instructions of prefetched instructions. If the cache stores a requested instruction, it is supplied to the central processing unit core from the cache. If the cache stores a prefetched instruction, the program memory controller takes no action.

If the cache does not store a requested instruction or a prefetched instruction, then the program controller requests cache service from another memory. The program memory controller determines the allocated cache way for the request address. The request address, the corresponding allocated cache way, and a request identification are stored in a scoreboard entry while the cache service is pending.

This invention involves a particular cache hazard. With the prefetch triggered by an instruction request, it is possible that an instruction request for a following instruction that is a miss in the cache occurs while the cache system is servicing a pending prefetch for the same instructions. In this situation, generating a cache service request for the instruction request causes redundant operation. This negates the value of the pending prefetch. In the prior art, this hazard is detected by comparing the instruction request address of the instruction request with the request addresses of all entries in the scoreboard. This may require considerable electrical power because of the address size and the number of scoreboard entries. If the cache hazard is detected, the scoreboard entry is modified to change the pending prefetch into a demand fetch. Thus the later occurring instruction request is serviced by the return to the pending prefetch. If the hazard is not detected, then the program memory controller requests cache service for the demand request.

This invention detects this instruction hazard in a manner that saves electrical power. The program memory controller determines the cache way upon determination of a cache miss. This determined cache way is stored in the scoreboard entry for that cache service request. Under the conditions creating the hazard (demand request missing the cache to the same instructions as a pending prefetch), the demand request and the prefetch would be allocated to the same way. The program memory controller compares the allocated way of the demand request to the allocated way of all the scoreboard entries. The cache hazard only occurs when the allocated ways match. Following way compare, the demand request address is compared to the request addresses of only those scoreboard entries having matching ways. Other address comparators are not powered during this time. This serves to reduce the electrical power required in detecting this cache hazard.

BRIEF DESCRIPTION OF THE DRAWINGS

These and other aspects of this invention are illustrated in the drawings, in which:

FIG. 13 illustrates an example of the instruction coding of instructions used by this invention;

FIG. 14 illustrates the bit coding of a condition code extension slot 0;

FIG. 15 illustrates the bit coding of a condition code extension slot 1;

FIG. 16 illustrates the bit coding of a constant extension slot 0;

DETAILED DESCRIPTION

Figure 1:
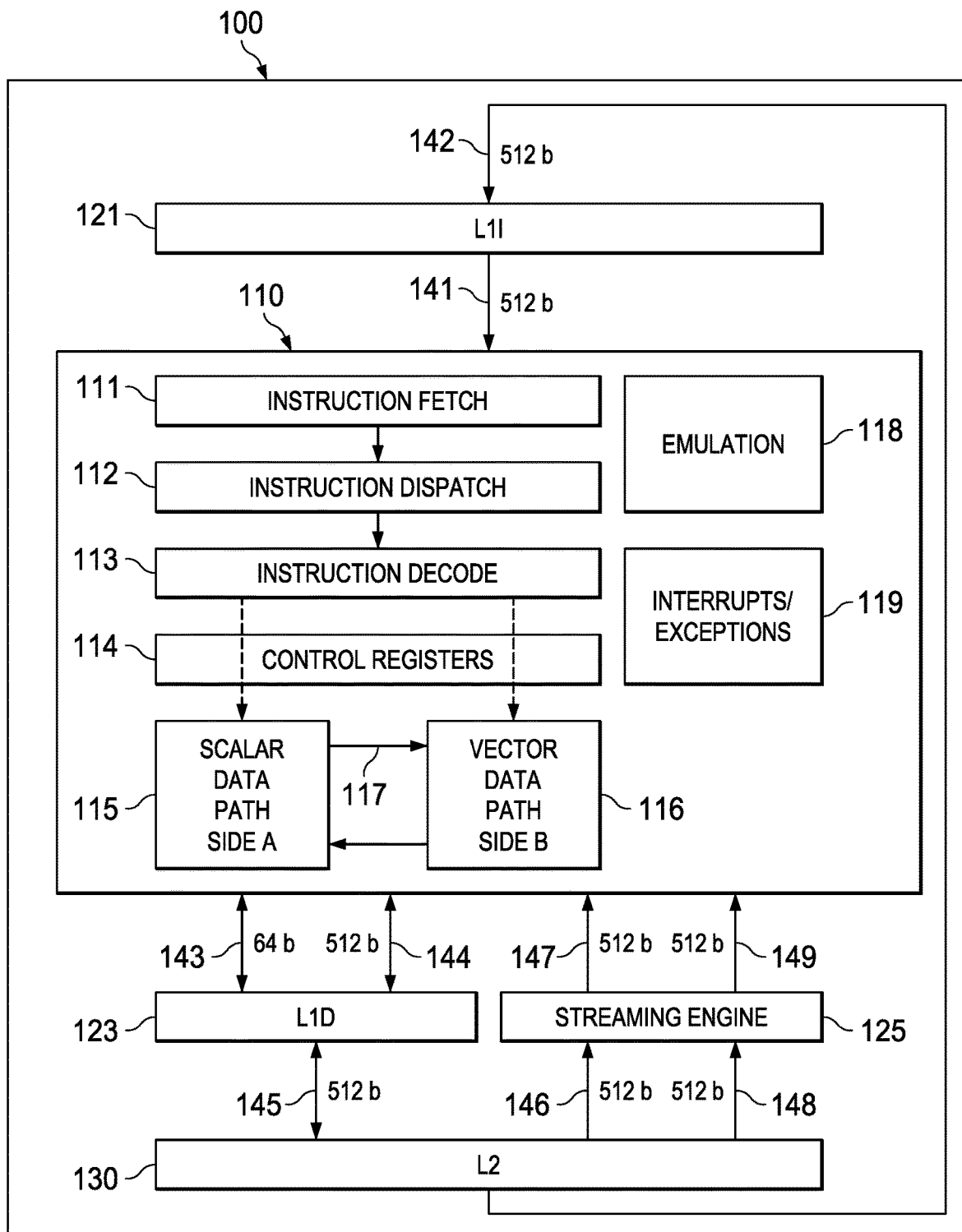
FIG. 1 illustrates a dual scalar/vector datapath processor according to one embodiment of this invention.

FIG. 1 illustrates a dual scalar/vector datapath processor according to a preferred embodiment of this invention. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In the preferred embodiment of processor 100 level two combined instruction/data cache 130 stores both instructions to back up level one instruction cache 121 and data to back up level one data cache 123. In the preferred embodiment level two combined instruction/data cache 130 is further connected to higher level cache and/or main memory in a manner known in the art and not illustrated in FIG. 1. In the preferred embodiment central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined instruction/data cache 130. In the preferred embodiment the size of a cache line in level one instruction cache 121 equals the size of a fetch packet. The memory locations of these instructions are either a hit in level two combined instruction/data cache 130 or a miss. A hit is serviced from level two combined instruction/data cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In the preferred embodiment of this invention, central processing unit core 110 includes plural functional units to perform instruction specified data processing tasks. Instruction dispatch unit 112 determines the target functional unit of each fetched instruction. In the preferred embodiment central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In the preferred embodiment instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116 in a manner not relevant to this invention. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enable central processing unit core 110 to be responsive to external, asynchronous events (interrupts) and to respond to attempts to perform improper operations (exceptions).

Central processing unit core 110 includes streaming engine 125. Streaming engine 125 supplies two data streams from predetermined addresses typically cached in level two combined instruction/data cache 130 to register files of vector datapath side B. This provides controlled data movement from memory (as cached in level two combined instruction/data cache 130) directly to functional unit operand inputs. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit core 110. Level two combined instruction/data cache 130 supplies instructions to level one instruction cache 121 via bus 142. Bus 142 is preferably a 512-bit bus. Bus 142 is unidirectional from level two combined instruction/data cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit core 110 data reads and data writes. Level one data cache 123 exchanges data with level two combined instruction/data cache 130 via bus 145. Bus 145 is preferably a 512-bit bus. Bus 145 is illustrated as bidirectional supporting cache service for both central processing unit core 110 data reads and data writes.

As known in the art, CPU data requests are directly fetched from level one data cache 123 upon a cache hit (if the requested data is stored in level one data cache 123). Upon a cache miss (the specified data is not stored in level one data cache 123), this data is sought in level two combined instruction/data cache 130. The memory locations of this requested data is either a hit in level two combined instruction/data cache 130 or a miss. A hit is serviced from level two combined instruction/data cache 130. A miss is serviced from another level of cache (not illustrated) or from main memory (not illustrated). As is known in the art, the requested instruction may be simultaneously supplied to both level one data cache 123 and central processing unit core 110 to speed use.

Level two combined instruction/data cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined instruction/data cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are illustrated as unidirectional from level two combined instruction/data cache 130 to streaming engine 125 and to vector datapath side B 116 in accordance with the preferred embodiment of this invention.

Steaming engine data requests are directly fetched from level two combined instruction/data cache 130 upon a cache hit (if the requested data is stored in level two combined instruction/data cache 130). Upon a cache miss (the specified data is not stored in level two combined instruction/data cache 130), this data is sought from another level of cache (not illustrated) or from main memory (not illustrated). It is technically feasible in some embodiments for level one data cache 123 to cache data not stored in level two combined instruction/data cache 130. If such operation is supported, then upon a streaming engine data request that is a miss in level two combined instruction/data cache 130, level two combined instruction/data cache 130 should snoop level one data cache 123 for the stream engine requested data. If level one data cache 123 stores this data its snoop response would include the data, which is then supplied to service the streaming engine request. If level one data cache 123 does not store this data its snoop response would indicate this and level two combined instruction/data cache 130 must service this streaming engine request from another level of cache (not illustrated) or from main memory (not illustrated).

In the preferred embodiment of this invention, both level one data cache 123 and level two combined instruction/data cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
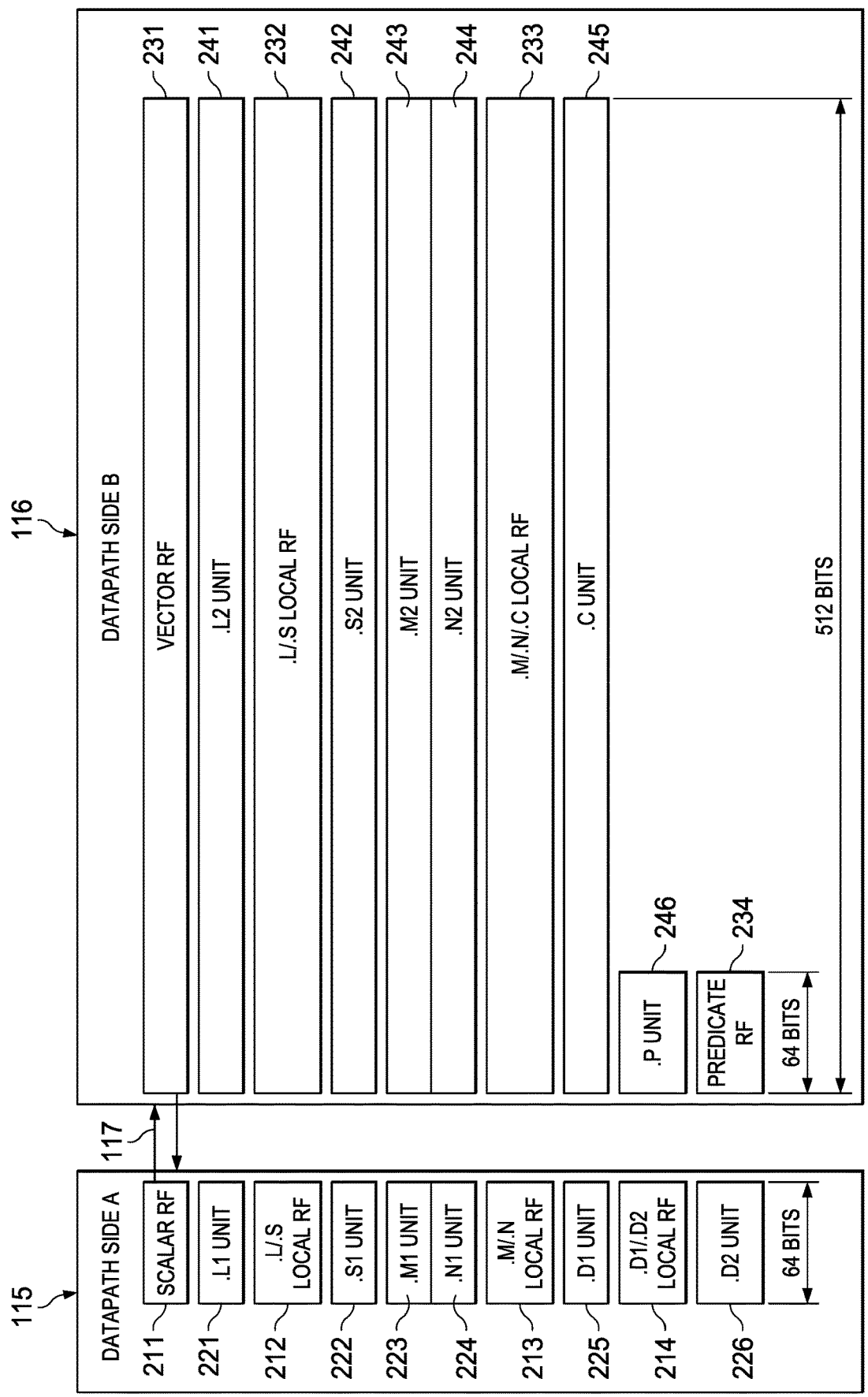
FIG. 2 illustrates the registers and functional units in the dual scalar/vector datapath processor illustrated in FIG. 1.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global scalar register file 231, L2/S2 local register file 232, M2/N2/C local register file 233 and predicate register file 234. Vector datapath side B 116 includes L2 unit 241, S2 unit 242, M2 unit 243, N2 unit 244, C unit 245 and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213 or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211 or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213 or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222 except on wider 512-bit data. The result may be written into an instruction specified register of global vector register file 231, L2/S2 local register file 232, M2/N2/C local register file 233 or predicate register file 234.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/S2 local register file 232 or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 includes also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include AND, ANDN, OR, XOR, NOR, BITR, NEG, SET, BITCNT, RMBD, BIT Decimate and Expand. A commonly expected use of P unit 246 includes manipulation of the SIMD vector comparison results for use in control of a further SIMD vector operation.

Figure 3:
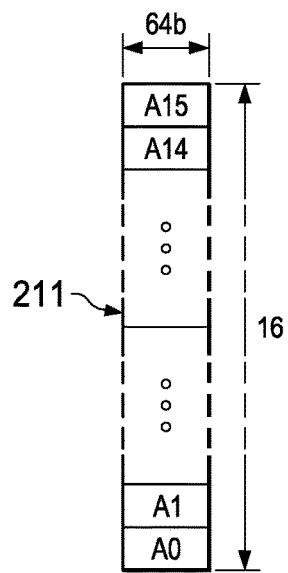
FIG. 3 illustrates a global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245 and P unit 246) can read from global scalar register file 211 via crosspath 117 under restrictions that will be detailed below.

Figure 4:
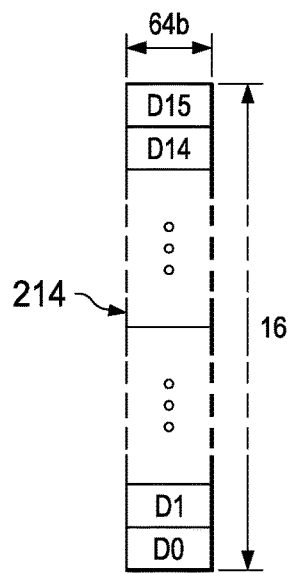
FIG. 4 illustrates a local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

Figure 5:
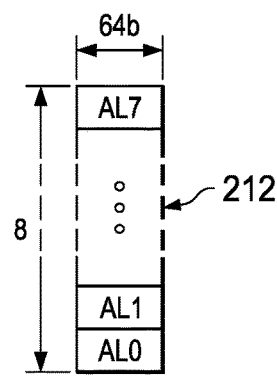
FIG. 5 illustrates a local scalar register file shared by multiply functional units.

FIG. 5 illustrates L1/S1 local register file 212. The embodiment illustrated in FIG. 5 has 8 independent 64-bit wide scalar registers designated AL0 to AL7. The preferred instruction coding (see FIG. 13) permits L1/S1 local register file 212 to include up to 16 registers. The embodiment of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

Figure 6:
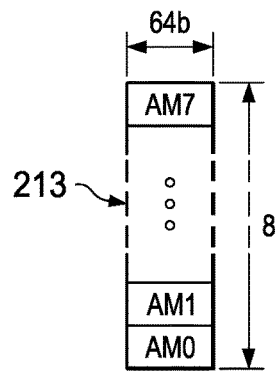
FIG. 6 illustrates a local scalar register file shared by load/store units.

FIG. 6 illustrates M1/N1 local register file 213. The embodiment illustrated in FIG. 6 has 8 independent 64-bit wide scalar registers designated AM0 to AM7. The preferred instruction coding (see FIG. 13) permits M1/N1 local register file 213 to include up to 16 registers. The embodiment of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
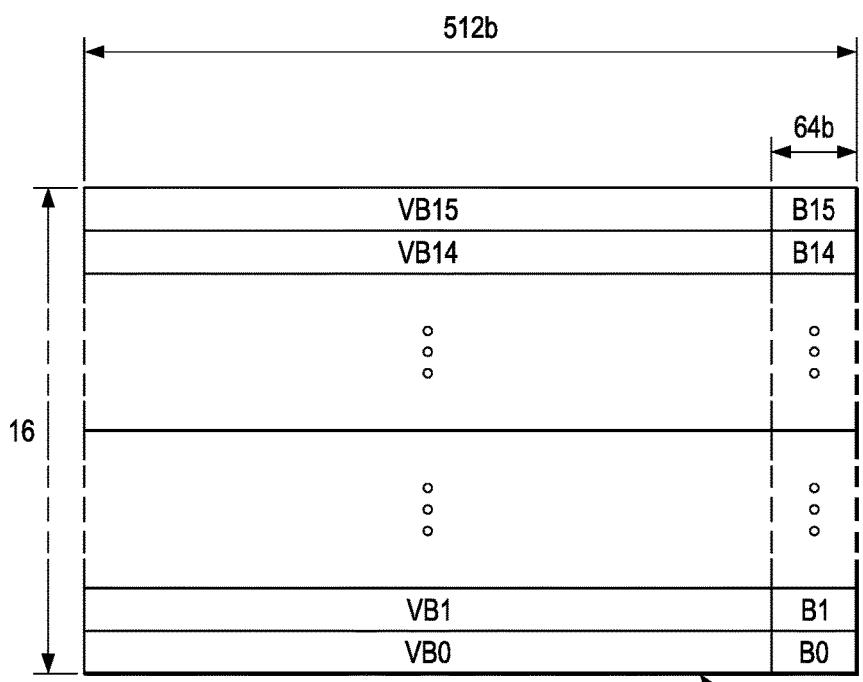
FIG. 7 illustrates a global vector register file.

FIG. 7 illustrates global vector register file 231. There are 16 independent 512-bit wide vector registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245 and P unit 246) can read or write to global vector register file 231. Scalar datapath side A 115 functional units (L1 unit 221, S1 unit 222, M1 unit 223, N1 unit 224, D1 unit 225 and D2 unit 226) can read from global vector register file 231 via crosspath 117 under restrictions that will be detailed below.

Figure 8:
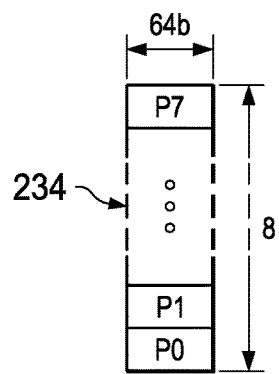
FIG. 8 illustrates a predicate register file.

FIG. 8 illustrates P local register file 234. There are 8 independent 64-bit wide registers designated P0 to P15. Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242 or C unit 244; manipulation of the SIMD vector comparison results by P unit 246; and use of the manipulated results in control of a further SIMD vector operation.

Figure 9:
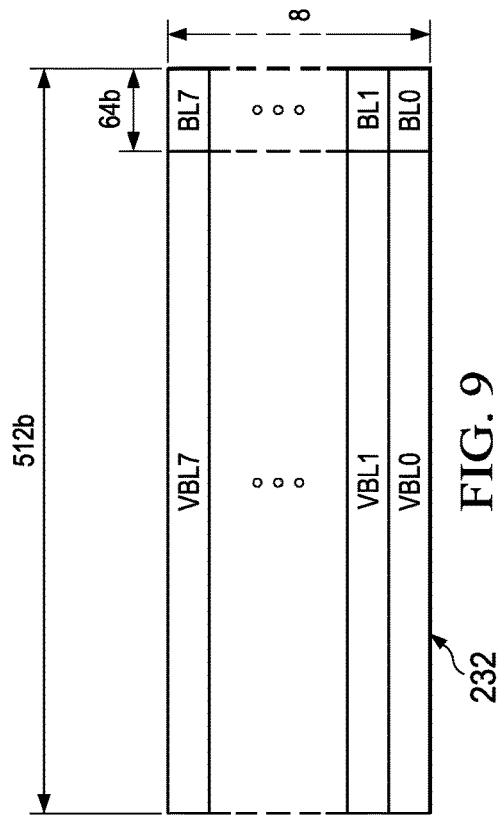
FIG. 9 illustrates a local vector register file shared by arithmetic functional units.

FIG. 9 illustrates L2/S2 local register file 232. The embodiment illustrated in FIG. 9 has 8 independent 512-bit wide vector registers. The preferred instruction coding (see FIG. 13) permits L2/S2 local register file 232 to include up to 16 registers. The embodiment of FIG. 9 implements only 8 registers to reduce circuit size and complexity. Each register of L2/S2 local vector register file 232 can be read from or written to as 64-bits of scalar data designated BL0 to BL7. Each register of L2/S2 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 24, C unit 245 and P unit 246) can write to L2/S2 local vector register file 232. Only L2 unit 241 and S2 unit 242 can read from L2/S2 local vector register file 232.

Figure 10:
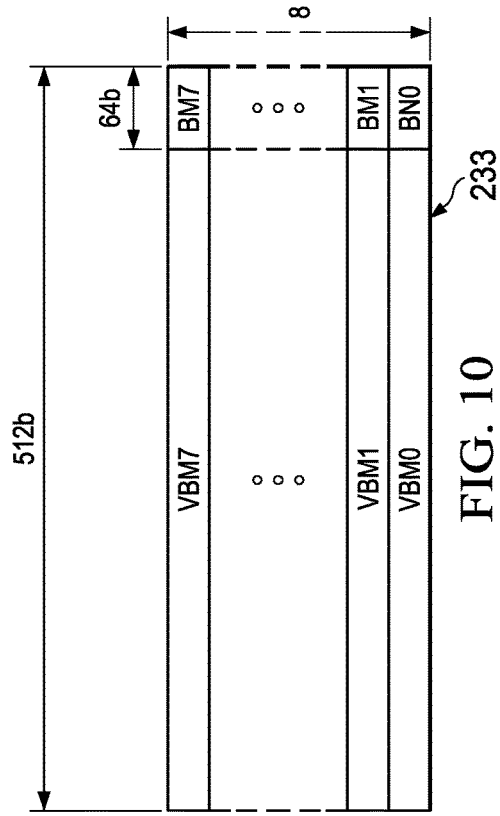
FIG. 10 illustrates a local vector register file shared by multiply and correlation functional units.

FIG. 10 illustrates M2/N2/C local register file 233. The embodiment illustrated in FIG. 10 has 8 independent 512-bit wide vector registers. The preferred instruction coding (see FIG. 13) permits M2/N2/C local register file 233 to include up to 16 registers. The embodiment of FIG. 10 implements only 8 registers to reduce circuit size and complexity. Each register of M2/N2/C local vector register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 243, N2 unit 244 and C unit 245 can read from M2/N2/C local vector register file 233.

The provision of global register files accessible by all functional units of a side and local register files accessible by only some of the functional units of a side is a design choice. This invention could be practiced employing only one type of register file corresponding to the disclosed global register files.

Crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type.

Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened streaming engine 125: calculates the address; fetches the defined data type from level two combined instruction/data cache 130 (which may require cache service from a higher level memory); performs data type manipulation such as zero extension, sign extension, data element sorting/swapping such as matrix transposition; and delivers the data directly to the programmed data register file within central processing unit core 110. Streaming engine 125 is thus useful for real-time digital filtering operations on well-behaved data. Streaming engine 125 frees these memory fetch tasks from the corresponding CPU enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

Central processing unit core 110 operates on an instruction pipeline. Instructions are fetched in instruction packets of fixed length further described below. All instructions require the same number of pipeline phases for fetch and decode, but require a varying number of execute phases.

Figure 11:
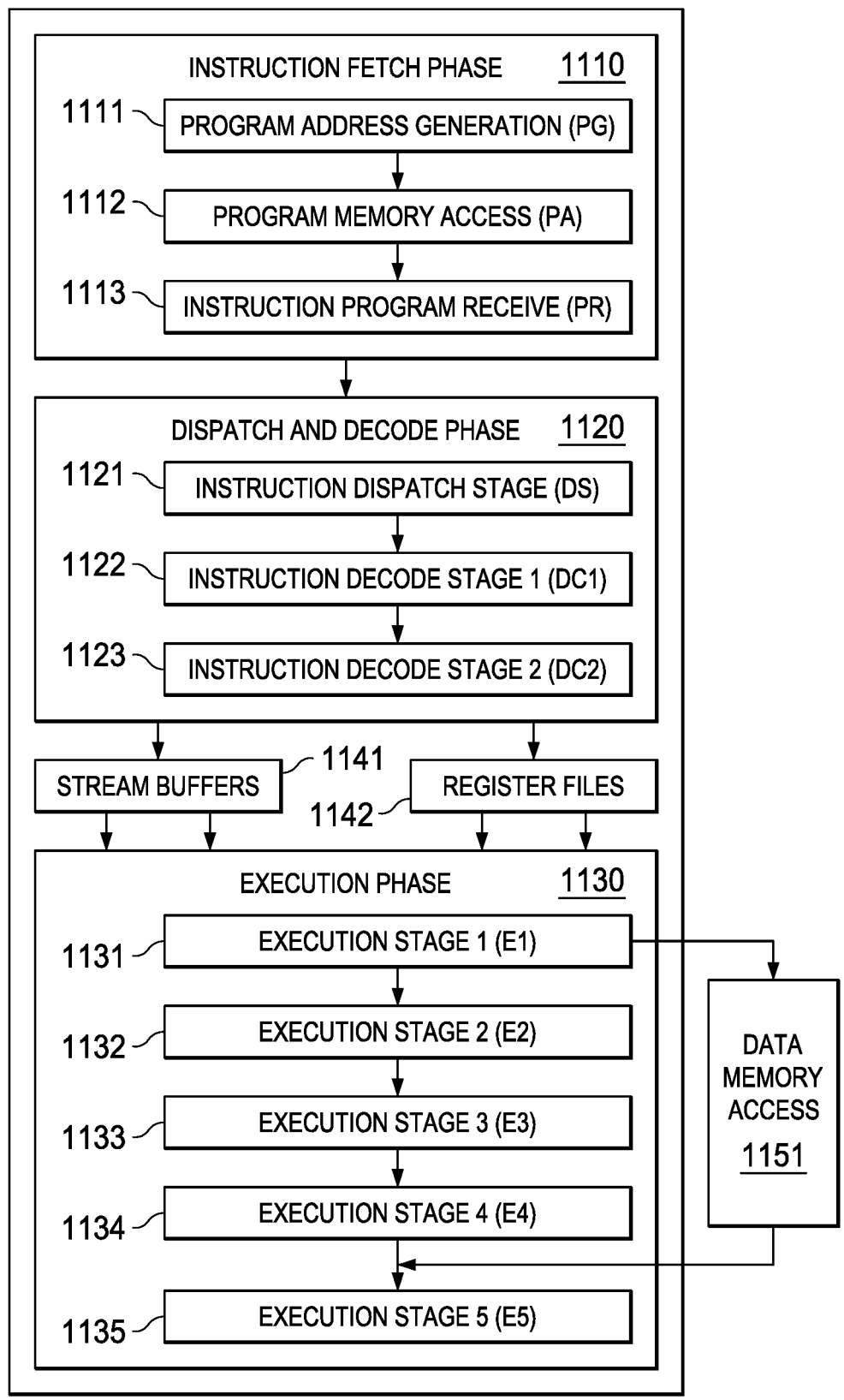
FIG. 11 illustrates pipeline phases of a central processing unit according to a preferred embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache 121. During the program access stage 1112 (PA) the level one instruction cache 121 processes the request, accesses the data in its memory and sends a fetch packet to the CPU boundary. During the program receive stage 1113 (PR) the CPU registers the fetch packet.

Figure 12:
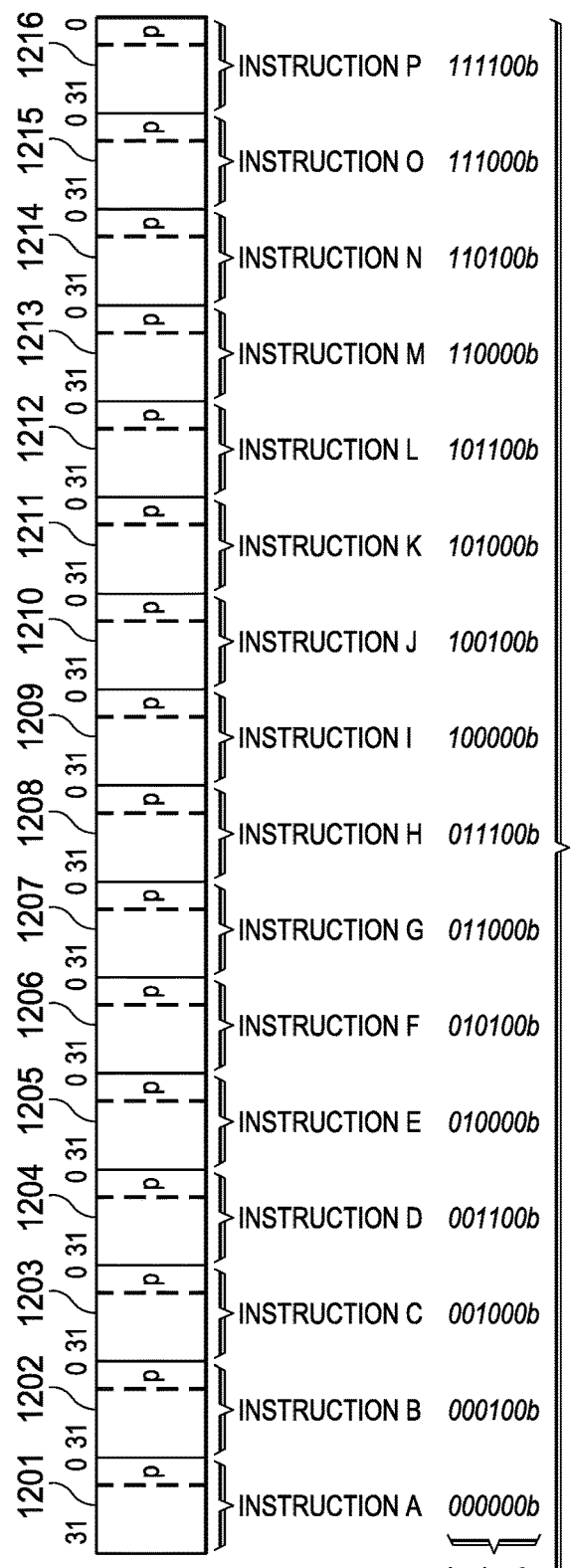
FIG. 12 illustrates sixteen instructions of a single fetch packet.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. The preferred embodiment employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by pre-determined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

Central processing unit core 110 and level one instruction cache 121 pipelines are de-coupled from each other. Fetch packet returns from level one instruction cache 121 can take different number of clock cycles, depending on external circumstances such as whether there is a hit in level one instruction cache 121 or a hit in level two combined instruction/data cache 130. Therefore program access stage 1112 (PA) can take several clock cycles instead of 1 clock cycle as in the other stages.

The instructions executing in parallel constitute an execute packet. In the preferred embodiment an execute packet can contain up to sixteen instructions. No two instructions in an execute packet may use the same functional unit. A slot is one of five types: 1) a self-contained instruction executed on one of the functional units of central processing unit core 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1110 include instruction dispatch to appropriate execution unit stage 1121 (DS), instruction pre-decode stage 1122 (DC1), and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in the PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding 1300 of functional unit instructions used by this invention. Those skilled in the art would realize that other instruction codings are feasible and within the scope of this invention. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The creg field 1301 (bits 29 to 31) and the z bit 1302 (bit 28) are optional fields used in conditional instructions. These bits are used for conditional instructions to identify the predicate register and the condition. The z bit 1302 (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field 1301 and the z field 1302 are encoded in the instruction as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Execution of a conditional instruction is conditional upon the value stored in the specified data register. This data register is in the global scalar register file 211 for all functional units. Note that "z" in the z bit column refers to the zero/not zero comparison selection noted above and "x" is a don't care state. This coding can only specify a subset of the 16 global registers as predicate registers. This selection was made to preserve bits in the instruction coding. Note that unconditional instructions do not have these optional bits. For unconditional instructions these bits in fields 1301 and 1302 (28 to 31) are preferably used as additional opcode bits.

The dst field 1303 (bits 23 to 27) specifies a register in a corresponding register file as the destination of the instruction results.

The src2/cst field 1304 (bits 18 to 22) has several meanings depending on the instruction opcode field (bits 3 to 12 for all instructions and additionally bits 28 to 31 for unconditional instructions). The first meaning specifies a register of a corresponding register file as the second operand. The second meaning is an immediate constant. Depending on the instruction type, this is treated as an unsigned integer and zero extended to a specified data length or is treated as a signed integer and sign extended to the specified data length.

The src1 field 1305 (bits 13 to 17) specifies a register in a corresponding register file as the first source operand.

The opcode field 1306 (bits 3 to 12) for all instructions (and additionally bits 28 to 31 for unconditional instructions) specifies the type of instruction and designates appropriate instruction options. This includes unambiguous designation of the functional unit used and operation performed. A detailed explanation of the opcode is beyond the scope of this invention except for the instruction options detailed below.

The e bit 1307 (bit 2) is only used for immediate constant instructions where the constant may be extended. If e=1, then the immediate constant is extended in a manner detailed below. If e=0, then the immediate constant is not extended. In that case the immediate constant is specified by the src2/cst field 1304 (bits 18 to 22). Note that this e bit 1307 is used for only some instructions. Accordingly, with proper coding this e bit 1307 may be omitted from instructions which do not need it and this bit used as an additional opcode bit.

The s bit 1308 (bit 1) designates scalar datapath side A 115 or vector datapath side B 116. If s=0, then scalar datapath side A 115 is selected. This limits the functional unit to L1 unit 221, S1 unit 222, M1 unit 223, N1 unit 224, D1 unit 225 and D2 unit 226 and the corresponding register files illustrated in FIG. 2. Similarly, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1309 (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to twelve instructions. Each instruction in an execute packet must use a different functional unit.

There are two different condition code extension slots. Each execute packet can contain one each of these unique 32-bit condition code extension slots which contains the 4-bit creg/z fields for the instructions in the same execute packet. FIG. 14 illustrates the coding for condition code extension slot 0 and FIG. 15 illustrates the coding for condition code extension slot 1.

FIG. 14 illustrates the coding for condition code extension slot 0 having 32 bits. Field 1401 (bits 28 to 31) specify 4 creg/z bits assigned to the L1 unit 221 instruction in the same execute packet. Field 1402 (bits 27 to 24) specify 4 creg/z bits assigned to the L2 unit 241 instruction in the same execute packet. Field 1403 (bits 19 to 23) specify 4 creg/z bits assigned to the S1 unit 222 instruction in the same execute packet. Field 1404 (bits 16 to 19) specify 4 creg/z bits assigned to the S2 unit 242 instruction in the same execute packet. Field 1405 (bits 12 to 15) specify 4 creg/z bits assigned to the D1 unit 225 instruction in the same execute packet. Field 1406 (bits 8 to 11) specify 4 creg/z bits assigned to the D2 unit 226 instruction in the same execute packet. Field 1407 (bits 6 and 7) is unused/reserved. Field 1408 (bits 0 to 5) are coded a set of unique bits (CCEX0) to identify the condition code extension slot 0. Once this unique ID of condition code extension slot 0 is detected, the corresponding creg/z bits are employed to control conditional execution of any L1 unit 221, L2 unit 241, S1 unit 222, S2 unit 242, D1 unit 225 and D2 unit 226 instruction in the same execution packet. These creg/z bits are interpreted as shown in Table 1. If the corresponding instruction is conditional (includes creg/z bits) the corresponding bits in the condition code extension slot 0 override the condition code bits in the instruction. Note that no execution packet can have more than one instruction directed to a particular execution unit. No execute packet of instructions can contain more than one condition code extension slot 0. Thus the mapping of creg/z bits to functional unit instruction is unambiguous. Setting the creg/z bits equal to "0000" makes the instruction unconditional. Thus a properly coded condition code extension slot 0 can make some corresponding instructions conditional and some unconditional.

FIG. 15 illustrates the coding for condition code extension slot 1 having 32 bits. Field 1501 (bits 28 to 31) specify 4 creg/z bits assigned to the M1 unit 223 instruction in the same execute packet. Field 1502 (bits 27 to 24) specify 4 creg/z bits assigned to the M2 unit 243 instruction in the same execute packet. Field 1503 (bits 19 to 23) specify 4 creg/z bits assigned to the C unit 245 instruction in the same execute packet. Field 1504 (bits 16 to 19) specify 4 creg/z bits assigned to the N1 unit 224 instruction in the same execute packet. Field 1505 (bits 12 to 15) specify 4 creg/z bits assigned to the N2 unit 244 instruction in the same execute packet. Field 1506 (bits 6 to 11) is unused/reserved. Field 1507 (bits 0 to 5) are coded a set of unique bits (CCEX1) to identify the condition code extension slot 1. Once this unique ID of condition code extension slot 1 is detected, the corresponding creg/z bits are employed to control conditional execution of any M1 unit 223, M2 unit 243, C unit 245, N1 unit 224 and N2 unit 244 instruction in the same execution packet. These creg/z bits are interpreted as shown in Table 1. If the corresponding instruction is conditional (includes creg/z bits) the corresponding bits in the condition code extension slot 1 override the condition code bits in the instruction. Note that no execution packet can have more than one instruction directed to a particular execution unit. No execute packet of instructions can contain more than one condition code extension slot 1. Thus the mapping of creg/z bits to functional unit instruction is unambiguous. Setting the creg/z bits equal to "0000" makes the instruction unconditional. Thus a properly coded condition code extension slot 1 can make some instructions conditional and some unconditional.

It is feasible for both condition code extension slot 0 and condition code extension slot 1 to include a p bit to define an execute packet as described above in conjunction with FIG. 13. In the preferred embodiment, as illustrated in FIGS. 14 and 15, code extension slot 0 and condition code extension slot 1 preferably have bit 0 (p bit) always encoded as 1. Thus neither condition code extension slot 0 not condition code extension slot 1 can be in the last instruction slot of an execute packet.

There are two different constant extension slots. Each execute packet can contain one each of these unique 32-bit constant extension slots which contains 27 bits to be concatenated as high order bits with the 5-bit constant field 1305 to form a 32-bit constant. As noted in the instruction coding description above only some instructions define the src2/cst field 1304 as a constant rather than a source register identifier. At least some of those instructions may employ a constant extension slot to extend this constant to 32 bits.

FIG. 16 illustrates the fields of constant extension slot 0. Each execute packet may include one instance of constant extension slot 0 and one instance of constant extension slot 1. FIG. 16 illustrates that constant extension slot 0 1600 includes two fields. Field 1601 (bits 5 to 31) constitute the most significant 27 bits of an extended 32-bit constant including the target instruction scr2/cst field 1304 as the five least significant bits. Field 1602 (bits 0 to 4) are coded a set of unique bits (CSTX0) to identify the constant extension slot 0. In the preferred embodiment constant extension slot 0 1600 can only be used to extend the constant of one of an L1 unit 221 instruction, data in a D1 unit 225 instruction, an S2 unit 242 instruction, an offset in a D2 unit 226 instruction, an M2 unit 243 instruction, an N2 unit 244 instruction, a branch instruction, or a C unit 245 instruction in the same execute packet. Constant extension slot 1 is similar to constant extension slot 0 except that bits 0 to 4 are coded a set of unique bits (CSTX1) to identify the constant extension slot 1. In the preferred embodiment constant extension slot 1 can only be used to extend the constant of one of an L2 unit 241 instruction, data in a D2 unit 226 instruction, an S1 unit 222 instruction, an offset in a D1 unit 225 instruction, an M1 unit 223 instruction or an N1 unit 224 instruction in the same execute packet.

Constant extension slot 0 and constant extension slot 1 are used as follows. The target instruction must be of the type permitting constant specification. As known in the art this is implemented by replacing one input operand register specification field with the least significant bits of the constant as described above with respect to scr2/cst field 1304. Instruction decoder 113 determines this case, known as an immediate field, from the instruction opcode bits. The target instruction also includes one constant extension bit (e bit 1307) dedicated to signaling whether the specified constant is not extended (preferably constant extension bit=0) or the constant is extended (preferably constant extension bit=1). If instruction decoder 113 detects a constant extension slot 0 or a constant extension slot 1, it further checks the other instructions within that execute packet for an instruction corresponding to the detected constant extension slot. A constant extension is made only if one corresponding instruction has a constant extension bit (e bit 1307) equal to 1.

Figure 17:
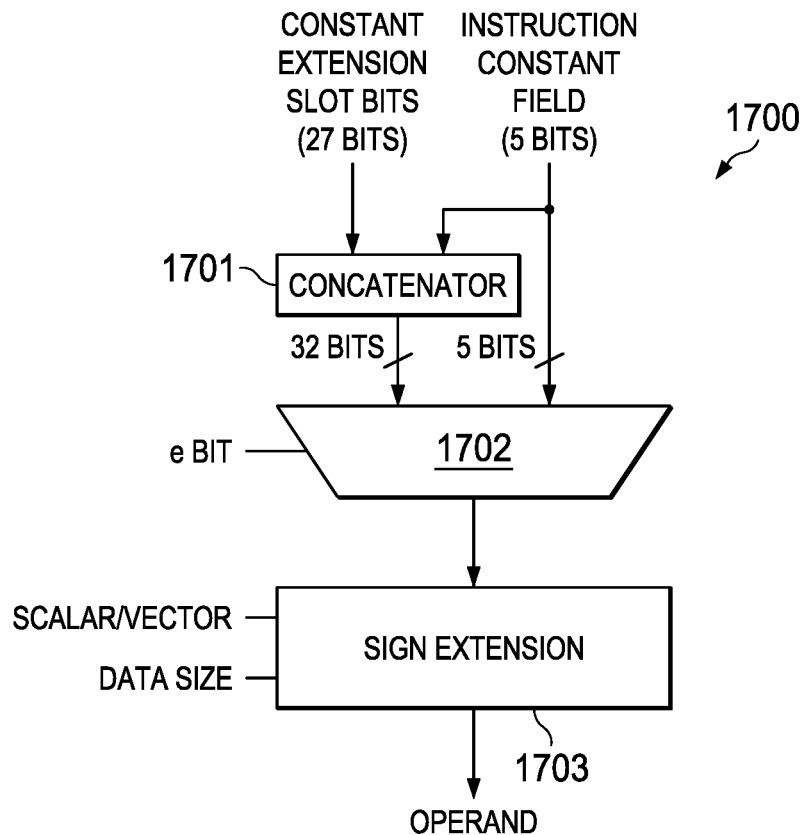
FIG. 17 is a partial block diagram illustrating constant extension.

FIG. 17 is a partial block diagram 1700 illustrating constant extension. FIG. 17 assumes that instruction decoder 113 detects a constant extension slot and a corresponding instruction in the same execute packet. Instruction decoder 113 supplies the 27 extension bits from the constant extension slot (bit field 1601) and the 5 constant bits (bit field 1305) from the corresponding instruction to concatenator 1701. Concatenator 1701 forms a single 32-bit word from these two parts. In the preferred embodiment the 27 extension bits from the constant extension slot (bit field 1601) are the most significant bits and the 5 constant bits (bit field 1305) are the least significant bits. This combined 32-bit word is supplied to one input of multiplexer 1702. The 5 constant bits from the corresponding instruction field 1305 supply a second input to multiplexer 1702. Selection of multiplexer 1702 is controlled by the status of the constant extension bit. If the constant extension bit (e bit 1307) is 1 (extended), multiplexer 1702 selects the concatenated 32-bit input. If the constant extension bit is 0 (not extended), multiplexer 1702 selects the 5 constant bits from the corresponding instruction field 1305. Multiplexer 1702 supplies this output to an input of sign extension unit 1703.

Sign extension unit 1703 forms the final operand value from the input from multiplexer 1703. Sign extension unit 1703 receives control inputs Scalar/Vector and Data Size. The Scalar/Vector input indicates whether the corresponding instruction is a scalar instruction or a vector instruction. The functional units of data path side A 115 (L1 unit 221, S1 unit 222, M1 unit 223, N1 unit 224, D1 unit 225 and D2 unit 226) can only perform scalar instructions. Any instruction directed to one of these functional units is a scalar instruction. Data path side B functional units L2 unit 241, S2 unit 242, M2 unit 243, N2 unit 244 and C unit 245 may perform scalar instructions or vector instructions. Instruction decoder 113 determines whether the instruction is a scalar instruction or a vector instruction from the opcode bits. P unit 246 may only perform scalar instructions. The Data Size may be 8 bits (byte B), 16 bits (half-word H), 32 bits (word W), 64 bits (double word D), quad word (128 bit) data or half vector (256 bit) data.

Table 2 lists the operation of sign extension unit 1703 for the various options.

TABLE 2

| Instruction Type | Operand Size | Constant Length | Action |
| --- | --- | --- | --- |
| Scalar | B/H/W/D | 5 bits | Sign extend to 64 bits |
| Scalar | B/H/W/D | 32 bits | Sign extend to 64 bits |
| Vector | B/H/W/D | 5 bits | Sign extend to operand size and replicate across whole vector |
| Vector | B/H/W | 32 bits | Replicate 32-bit constant across each 32-bit (W) lane |
| Vector | D | 32 bits | Sign extend to 64 bits and replicate across each 64-bit (D) lane |

It is feasible for both constant extension slot 0 and constant extension slot 1 to include a p bit to define an execute packet as described above in conjunction with FIG. 13. In the preferred embodiment, as in the case of the condition code extension slots, constant extension slot 0 and constant extension slot 1 preferably have bit 0 (p bit) always encoded as 1. Thus neither constant extension slot 0 nor constant extension slot 1 can be in the last instruction slot of an execute packet.

It is technically feasible for an execute packet to include a constant extension slot 0 or 1 and more than one corresponding instruction marked constant extended (e bit=1). For constant extension slot 0 this would mean more than one of an L1 unit 221 instruction, data in a D1 unit 225 instruction, an S2 unit 242 instruction, an offset in a D2 unit 226 instruction, an M2 unit 243 instruction or an N2 unit 244 instruction in an execute packet have an e bit of 1. For constant extension slot 1 this would mean more than one of an L2 unit 241 instruction, data in a D2 unit 226 instruction, an S1 unit 222 instruction, an offset in a D1 unit 225 instruction, an M1 unit 223 instruction or an N1 unit 224 instruction in an execute packet have an e bit of 1. Supplying the same constant extension to more than one instruction is not expected to be a useful function. Accordingly, in one embodiment instruction decoder 113 may determine this case an invalid operation and not supported. Alternately, this combination may be supported with extension bits of the constant extension slot applied to each corresponding functional unit instruction marked constant extended.

Special vector predicate instructions use registers in predicate register file 234 to control vector operations. In the current embodiment all these SIMD vector predicate instructions operate on selected data sizes. The data sizes may include byte (8 bit) data, half word (16 bit) data, word (32 bit) data, double word (64 bit) data, quad word (128 bit) data and half vector (256 bit) data. Each bit of the predicate register controls whether a SIMD operation is performed upon the corresponding byte of data. The operations of P unit 245 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

L1 unit 221, S1 unit 222, L2 unit 241, S2 unit 242 and C unit 245 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 18:
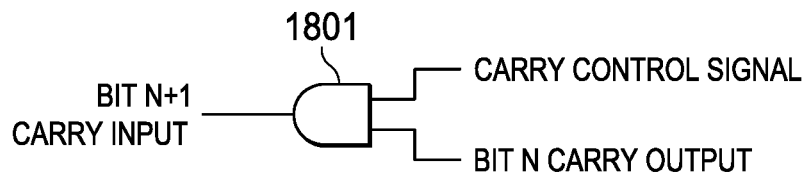
FIG. 18 illustrates the carry control for SIMD operations according to this invention.

FIG. 18 illustrates the carry control. AND gate 1801 receives the carry output of bit N within the operand wide arithmetic logic unit (64 bits for scalar datapath side A 115 functional units and 512 bits for vector datapath side B 116 functional units). AND gate 1801 also receives a carry control signal which will be further explained below. The output of AND gate 1801 is supplied to the carry input of bit N+1 of the operand wide arithmetic logic unit. AND gates such as AND gate 1801 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 3 below shows example carry control signals for the case of a 512 bit wide operand such as used by vector datapath side B 116 functional units which may be divided into sections of 8 bits, 16 bits, 32 bits, 64 bits, 128 bits or 256 bits. In Table 3 the upper 32 bits control the upper bits (bits 128 to 511) carries and the lower 32 bits control the lower bits (bits 0 to 127) carries. No control of the carry output of the most significant bit is needed, thus only 63 carry control signals are required.

TABLE 3

| Data Size | Carry Control Signals |
|---|---|
| 8 bits (B) | –000 0000 0000 0000 0000 0000 0000 0000<br>0000 0000 0000 0000 0000 0000 0000 0000 |
| 16 bits (H) | –101 0101 0101 0101 0101 0101 0101 0101<br>0101 0101 0101 0101 0101 0101 0101 0101 |
| 32 bits (W) | –111 0111 0111 0111 0111 0111 0111 0111<br>0111 0111 0111 0111 0111 0111 0111 0111 |
| 64 bits (D) | –111 1110111 11110111 11110111 1111<br>0111 1111 0111 1111 0111 1111 0111 1111 |
| 128 bits | –111 1111 1111 1111 0111 1111 1111 1111<br>0111 1111 1111 1111 0111 1111 1111 1111 |
| 256 bits | –111 1111 1111 1111 1111 1111 1111 1111<br>0111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Figure 19:
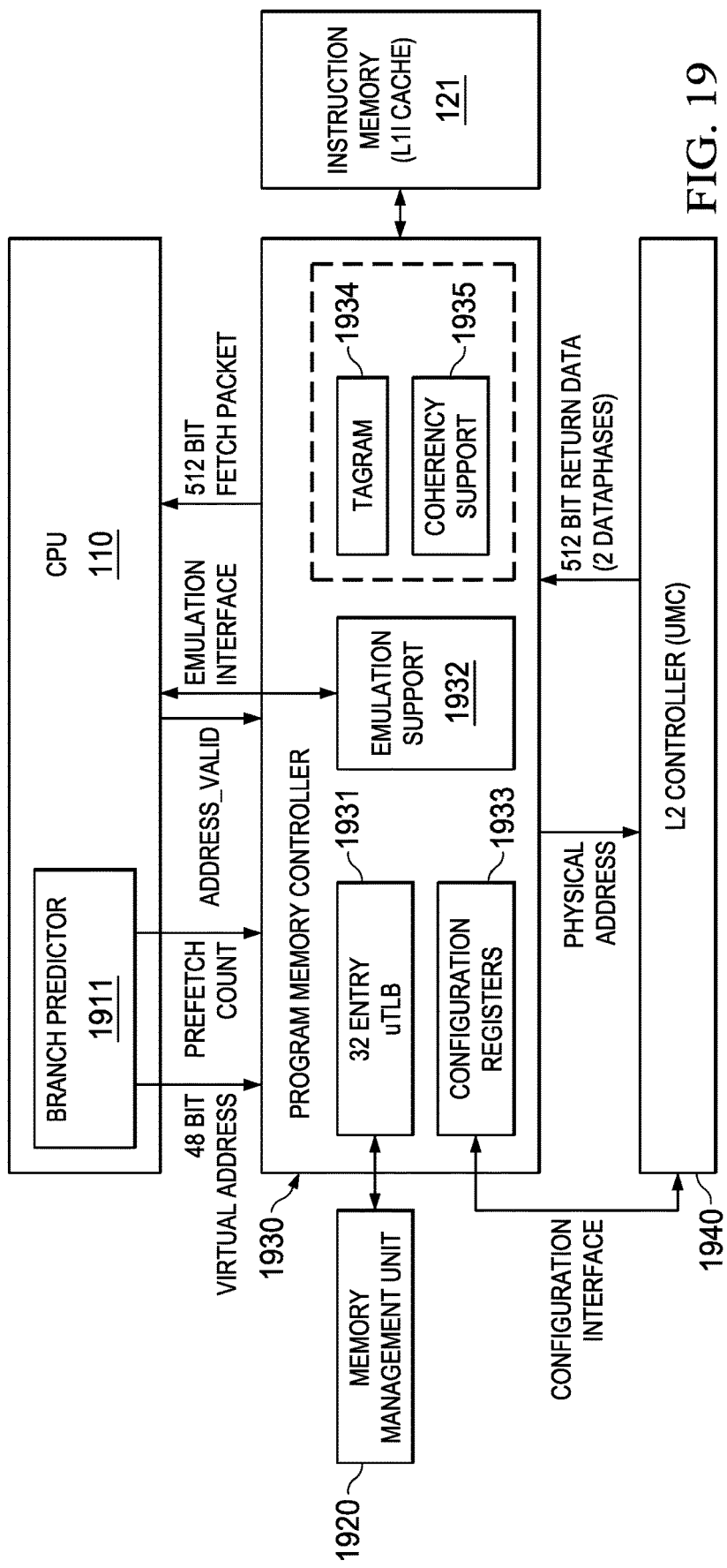
FIG. 19 illustrates one view of the combination of central processing unit core and the instruction cache and auxiliary support structures.

FIG. 19 illustrates one view showing the cooperation between central processing unit core 110 and a program memory controller 1930. Central processing unit core 110 regularly generates addresses for needed instructions for its operation. Central processing unit core 110 transmits to program memory controller 1930 an Address_Valid signal indicating the transmitted request address is valid. This will be used further in a manner described below.

In the preferred embodiment of this invention, central processing unit core 110 operates on virtual memory addresses. Also in the preferred embodiment the instructions cached in level one instruction cache 121 are accessed by these virtual addresses. As illustrated in FIG. 19, this virtual address is expressed in 48 bits in this exemplary embodiment. In the preferred embodiment, level two combined instruction/data cache 130 and other memories operate upon a physical address, requiring a conversion between the virtual address and the physical address for any cache misses to level one instruction cache 121 serviced by level two combined instruction/data cache 130.

Program memory controller 1930 includes a micro table look-aside buffer (μTLB) 1931 for address translation. If a tag comparison with TAGRAM 1934 determines the requested fetch packet is not stored in level one instruction cache 121 (miss), then this fetch packet is requested from level two combined instruction/data cache 130. Because level one instruction cache 121 is virtually tagged and level two combined instruction/data cache 130 is physically tagged, this requires an address translation. The virtual address is supplied to micro table look-aside buffer 1931. Address translation is typically performed using a table of most significant bits of virtual addresses and the corresponding most significant bits of physical addresses. In this example upon detecting the correct address pair, the address translation substitutes the most significant physical address bits from the table for the most significant virtual address bits of the requested address. It is typical that the least significant bits of the virtual address are the same as the least significant bits of the physical address. In this example, a complete virtual address/physical address translation table is stored in memory management unit (MMU) 1920. In addition, level one instruction cache 121 includes micro table look-aside buffer 1931 which stores a subset of some of the address translation table entries in a cache-like fashion. When servicing an address translation, the requested virtual address is compared with address translation table entries stored in micro table look-aside buffer 1931. If the virtual address matches a table entry in micro table look-aside buffer 1931, the matching table entry is used for address translation. If the virtual address does not match any table entry in micro table look-aside buffer 1931, then these address translation parameters are fetched from the memory management unit 1920. Micro table look-aside buffer 1931 transmits a page translation entry request for the virtual address to memory management unit 1920. Memory management unit 1920 finds the corresponding address translation entry and returns this entry to micro table look-aside buffer 1931. Micro table look-aside buffer 1931 stores this newly fetched translation entry, typically casting out a currently stored entry to make room. Following address translation the physical address passes to level two combined instruction/data cache 130.

Branch predictor 1911 supplies the virtual fetch address to program memory controller 1930 as well as a prefetch count. Branch prediction typically stores the memory address of each conditional branch instruction encountered in the program code as it executes. This enables branch predictor 1911 to recognize a conditional branch it has encountered. Associated with the conditional instruction address is a taken/not taken branch prediction and any branching history used in dynamic branch prediction. This branch prediction information will always be limited to a fairly small section of the program code due to limits in the amount of memory and circuits which are included within branch predictor 1911. However, based upon the current instruction memory location and the predicted path through the program code due to branch prediction, branch predictor 1911 can determine a predicted number of linearly following instruction fetch packets to be used after the current instruction fetch packet access before a branch is predicted to be taken off this linear path. This number is called the fetch packet count or the prefetch count.

Central processing unit core 110 exchanges emulation information with emulation support unit 1932 which is a part of program memory controller 1930.

Central processing unit core 110 receives instructions in the form of instruction fetch packets from program memory controller 1930. As illustrated in FIG. 19, these fetch packets are 512 bits (64 bytes) in the preferred embodiment. In the preferred embodiment level one instruction cache 121, level two combined instruction/data cache 130 and any other memory store fetch packets aligned with 64 byte boundaries. Depending upon where the instructions are stored, this fetch packet may be recalled from level one instruction cache 121, level two combined instruction/data cache 130 or other memory.

Program memory controller 1930 compares a portion of the fetch address received from central processing unit core 110 with entries in TAGRAM 1934. TAGRAM 1934 stores tag data for each cache line stored in level one instruction cache 121. Corresponding most significant bits of the fetch address are compared with each set of tags in TAGRAM 1934. A match between these bits of the fetch address and any tag (hit) indicates that the instructions stored at the fetch address are stored in level one instruction cache 121 at a location corresponding to the matching tag. Upon such a match, program memory controller 1930 recalls the instructions from level one instruction cache 121 for supply as a fetch packet to central processing unit core 110.

The failure of a match between these bits of the fetch address and any tag (miss) indicates that the instructions stored at the fetch address are not stored in level one instruction cache 121. Program memory controller 1930 transmits a cache request to unified memory controller (UMC) 1940 to seek the instructions in level two combined instruction/data cache 130 (FIG. 1). The cache request is accompanied by a physical address translated from the virtual address as discussed above. If the instructions at this address are stored in level two combined instruction/data cache 130 (hit), the request is serviced from this cache. Otherwise the request is supplied to a higher level memory (not illustrated).

Program memory controller 1930 includes coherency support unit 1935. Coherence support unit 1935 makes sure that data movements preserve the most recent instructions for supply to central processing unit core 110.

Figure 20:
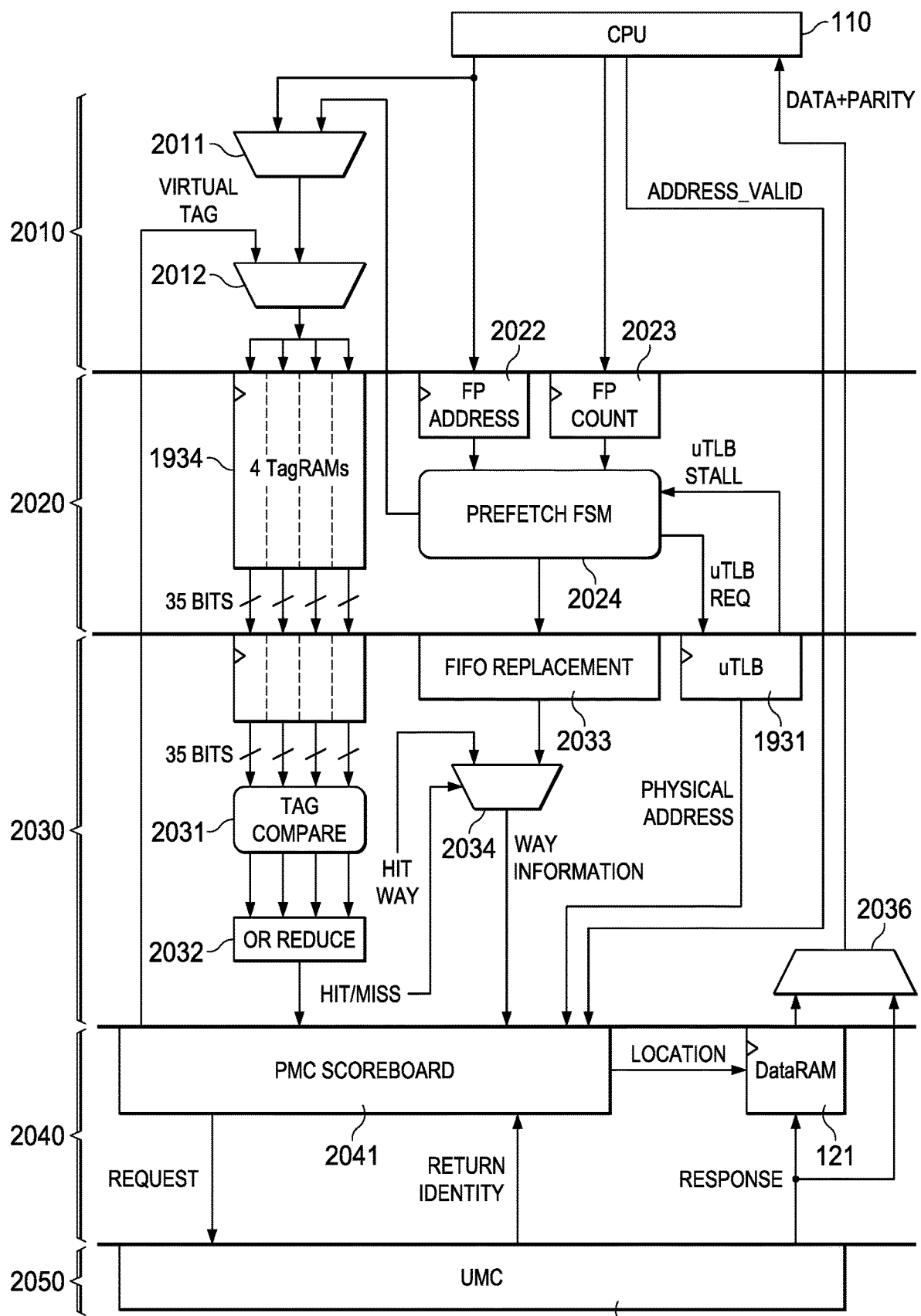
FIG. 20 illustrates a second view of the combination of central processing unit core and the instruction cache and auxiliary support structures.

FIG. 20 illustrates another view of the interface between the central processing unit core 110 and program memory controller 1930. In the preferred embodiment, level one instruction cache 121 has a fixed cache size of 32 KB. Level one instruction cache 121 maximizes performance of the code execution and facilitates fetching instructions at a fast clock rate. Level one instruction cache 121 hides the latency associated with executing code store in a slower system memory. Each central processing unit core 110 interfaces with a separate program memory controller 1930, which interface with the unified memory controller 1940 for level two combined instruction/data cache 130.

In the preferred embodiment level one instruction cache 121 and program memory controller 1930 include the following attributes. They comprise a 32 KB 4-way instruction cache. They are virtually indexed and virtually tagged cache with a 49-bit virtual address. They include virtualization support having an integrated micro table look-aside buffer 1931. The cache lines have a size of 64 bytes. In the preferred embodiment this is the same size as a fetch packet. They can queue up to 8 pairs of fetch packet requests to unified memory controller 1940 to enable prefetch in a program pipeline.

Central processing unit core 110 transmits a fetch address and a fetch packet count upon each instruction fetch request. The fetch address is accompanied by an Address_Valid signal indicating whether the fetch address is valid. The fetch packet count is generated by branch predictor 1911 (FIG. 19). The fetch packet count indicates a predicted number of sequential 64-byte cache lines to be returned to central processing unit core 110 starting from the given address. Program memory controller 1930 prefetch finite state machine 2024 issues a prefetch for each of the packets and combines them into pairs in scoreboard 2041 whenever an incoming request to the scoreboard can be satisfied by the second dataphase of the previous request. A fetch packet count of 0 indicates central processing unit core 110 requests for program memory controller 1930 to fetch 64-byte lines with no fetch ahead. Central processing unit core 110 must request a flush for program memory controller 1930 to exit incremental mode and resume normal operation.

Figure 21:
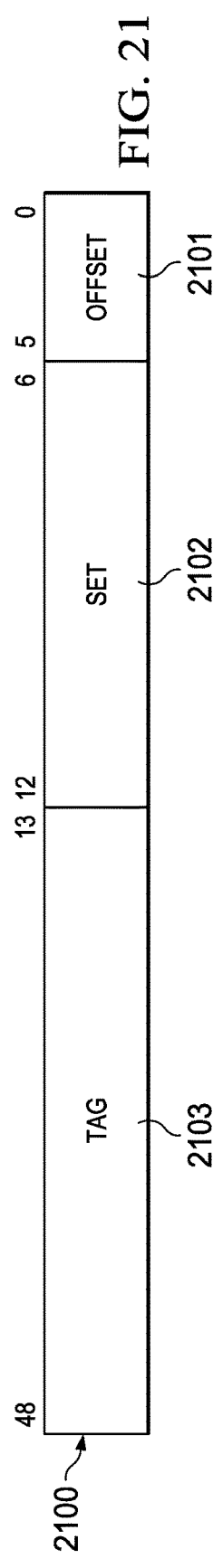
FIG. 21 illustrates how the bits of a fetch address are parsed for handling.

FIG. 21 illustrates how a fetch address 2100 is parsed for handling by program memory controller 1930. Fetch address 2100 is divided into: offset 2101; set 2102; and tag 2103. Cache lines in level one instruction cache 121 are 64 bytes long. Assuming memory is byte addressable, then the location within a cache line of level one instruction cache 121 serves as a proxy for the six least significant bits of the address (offset 2101). Set bits 2102 correspond directly to a physical location within level one instruction cache 121. If level one instruction cache 121 stores an instruction, it is in a location corresponding to set bits 2102. The tag bits 2103 are stored for comparison with the fetch address. A match (hit) indicates that the addressed instruction(s) are stored in level one instruction cache 121. If no match is found (miss), then the instructions of the requested fetch packet must be obtained from another source than level one instruction cache 121.

Program memory controller 1930 operates in plural instruction phases. FIG. 20 illustrates phases: 2010; 2020; 2030; 2040; and 2050. Operations take place simultaneously during phase 2010, 2020, 2030, 2040 and 2050 on differing fetch requests.

Instruction fetch unit 111 (part of central processing unit core 110, see FIG. 1) determines the memory address of the next instruction fetch packet. This fetch address is supplied to one input of multiplexer 2011 active in phase 2010 together with an Address_Valid signal indicating this requested address is valid. This fetch address is also supplied to fetch address register 2022 active in phase 2020. As part of branch prediction, instruction fetch unit 111 also supplies a fetch packet count register 2023 active in phase 2020.

The combination of multiplexers 2011 and 2012 supply one of three addresses to TAGRAM 1934 for tag comparison. Multiplexer 2011 selects between the fetch address received from central processing unit core 110 and a prefetch address from prefetch finite state machine 2024. Formation of this prefetch address is described above. Multiplexer 2012 selects between the output of multiplexer 2011 and the virtual address in program memory controller scoreboard 2041 corresponding to a return from unified memory controller 1940. An access from program memory controller scoreboard 2041 has greatest priority. An access from central processor unit core 110 has the next highest priority. An access from prefetch finite state machine 2024 has the lowest priority.

During phase 2020 prefetch finite state machine (FSM) 2024 optionally generates a prefetch request. The prefetch request includes an address calculated from the central processing unit core 110 request address and the fetch packet count as described above. Prefetch finite state machine 2024 supplies the next prefetch address to multiplexer 2011. Prefetch finite state machine 2024 supplies a micro table look-aside buffer request to micro table look-aside buffer 2035 for page translation data for the prefetch address if it is a different page than the initial request from central processing unit core 110.

Also during phase 2020 the address selected by the multiplexers 2011 and 2012 in the prior phase 2010 are supplied to TAGRAM 1934 to begin tag comparison.

In phase 2030 the tag comparison completes. In the example illustrated in FIG. 20, tag compare 2031 separately compares the tag portion 2103 of the presented address with data stored in the four banks of TAGRAM 1934. The comparison generates either a hit or a miss. A hit indicates that instructions at the requested address are stored in memory 121. In this case multiplexer 2036 supplies these instructions from memory 121 to central processing unit core 110.

The tag compare of program memory controller 1930 obtains way information in parallel with information on the requested line. For cache hits the way information is needed to locate the requested fetch packet. For cache misses the way information determines the cache line evicted (written-over) by data returned from a higher level memory. On a level one instruction cache miss, program memory controller 1930 stores this way information in scoreboard 2041 with other data on the requested line. Scoreboard 2041 stores the Address_Valid signal to distinguish between demand accesses and prefetch accesses. Demand accesses (from central processing unit core 110) are accompanied by an Address_Valid signal indicating the request address is valid. Prefetch accesses (from prefetch finite state machine 2024) are not accompanied with this Address_Valid signal. Scoreboard 2041 stores this Address_Valid signal for each access to level two combined instruction/data cache 130. This serves as a proxy of whether the request to level two combined instruction/data cache 130 is in response to a demand fetch or a prefetch. The importance of this distinction will be further explained below. Once the data returns from level two combined instruction/data cache 131, program memory controller 1930 consults scoreboard 2041 to determine which way to store. A line to be allocated (whether demand or prefetch) is invalidated once the request is generated to avoid false hits by newer accesses while return data of the requested line is pending.

Upon a miss, program memory controller 1930 operating in phase 2040 seeks the instructions stored at that address from level two combined instruction/data cache 130 via unified memory controller 1940. This includes: establishing an entry in program memory controller scoreboard 2041; receiving way information from FIFO replacement unit 2033 selected by multiplexer 2034; and receiving the translated physical address from micro table look-aside buffer 1931. Program memory controller scoreboard 2041 generates a request signal to unified memory controller 1940 for the instructions stored at this translated physical address.

Program memory controller 1930 does not search in-flight requests stored in scoreboard 2041 for possible match between prior requests. Thus it is possible that two or more requests for the same cache line to be allocated to different ways of the same set. This could cause two or more matches upon tag compare if the same set is requested in the future. Whenever this occurs, program memory controller 1930 invalidates one of the duplicated tags and the corresponding cache way to free up the way for a new entry. This invalidation only occurs when a set with duplicate tags is accessed for a hit/miss decision on another request. In the preferred embodiment program memory controller 1930 keeps the most significant valid way (i.e. the way denoted by the MSB of the set's valid bits) while invalidating other ways. For example, if way 0 and way 2 have identical tags and are valid, then way 2 is kept and way 0 is invalidated. L1P does not invalidate duplicate tags on emulation accesses.

In phase 2050 (which may include more than one phase depending upon the location of the instructions sought) unified memory controller 1940 services the instruction request. This process includes determining whether the requested instructions are stored in level two combined instruction/data cache 130. On a cache hit to level two combined instruction/data cache 130, unified memory controller 1940 supplies the instructions from level two combined instruction/data cache 130. On a cache miss to level two combined instruction/data cache 130, unified memory controller 1940 seeks these instructions from another memory. This other memory could be an external third level cache or and an external main memory. The number of phases required to return the requested instructions depend upon whether they are cached in level two combined instruction/data cache 130, they are cached in an external level three cache or they are stored in external main memory.

All instructions returned from unified memory controller 1940 are stored in memory 121. Scoreboard 2014 supplies location data for this storage (including way data) according to stored data corresponding to the return identity. Thus these instructions are available for later use by central processing unit core 110. If the instruction request triggering the request to unified memory controller 1940 was directly from central processing unit core 110 (demand fetch), multiplexer 2036 contemporaneously supplies the returned instructions directly to central processing unit core 110. If the request triggering the request to unified memory controller 1940 was a prefetch request, then multiplexer 2036 blocks supply of these instructions to central processing unit core 110. These instructions are merely stored in memory 121 based upon an expectation of future need by central processing unit core 110. As previously mentioned, scoreboard 2041 store information enabling a determine if the return data is in response to a demand fetch or a prefetch.

Figure 22:
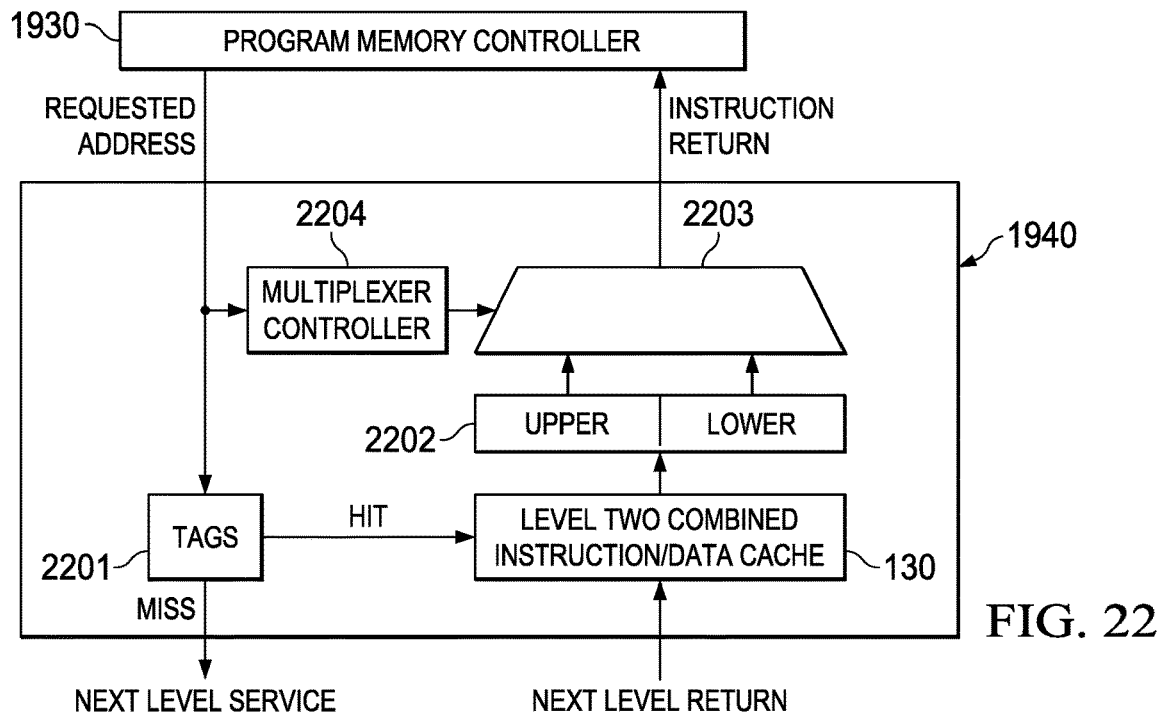
FIG. 22 illustrates the relevant details of the controller for the level two combined instructions/data cache.

FIG. 22 is a partial schematic diagram illustrating relevant parts of unified memory controller 1940. Program memory controller 1930 supplies a requested address to unified memory controller 1940 upon a level one cache miss.

Unified memory controller 1940 receives requests from program memory controller 1930 in the form of requested addresses. Program memory controller 1930 makes these requests upon a cache miss into level one instruction cache 121. The instructions stored at the requested address are not stored in level one instruction cache 121 and are sought for level two unified instruction/data cache 130. Thus program memory controller 1930 sends requested address to unified memory controller 1940.

The requested address is transmitted to tags 2201. In a manner known in the art, the requested address is compared with partial addresses store in tags 2201 to determine whether level two combined instruction/data cache 130 stores the instructions at the requested address. Upon detecting no match (miss), unified memory controller 1940 transmits a service request to a next level memory. This next level memory could be an external level three cache or an external main memory. This next level memory will ultimately return the data or instructions at the requested address. This return data or instructions are stored in level two combined instruction/data cache 130. This storage typically involves casting out and replacing another entry in level two combined instruction/data cache 130. The original request is then serviced from level two combined instruction/data cache 130.

Upon detecting a match (hit), tags 2201 transmits an indication of the address to level two combined instruction/data cache 130. This indication enables level two combined instruction/data cache to locate and recall a cache line corresponding to the requested address. This recalled cache line is stored in register 2201.

Register 2202 is illustrated as having an upper half and a lower half. The cache line size in level two combined instruction/data cache 130 is twice the cache line size in level one instruction cache 121. Thus recall of one cache line from level two combined instruction/data cache 130 can supply two cache lines for level one instruction cache 121. Multiplexer 2203 and multiplexer controller 2204 select either the upper half or the lower half of the level two combined instruction/data cache line for supply to program memory controller 1930.

Multiplexer controller 2204 receives the requested address from program memory controller 1930. In most circumstances one bit of this address controls the selection of multiplexer 2203. If this address bit is 0, then the requested address is in the lower half of the level two combined instruction/data cache line stored in register 2202. Multiplexer controller 2204 causes multiplexer 2202 to select the lower half of register 2203 for supply to program memory controller 1930. If this address bit is 1, then the requested address is in the upper half of the level two combined instruction/data cache line stored in register 2202, and multiplexer controller 2204 causes multiplexer 2202 to select this upper half. In the preferred embodiment cache lines in level one instruction cache 121 are 64 bytes and cache lines in level two combined instruction/data cache 130 are 128 bytes. For this cache line size selection, the controlling address bit is bit 7, because $2^7$ equals 128.

The goal of cache prefetching is to anticipate the needs of central processing unit core 110 to have each fetch packet of instructions stored in level one instruction cache 121 before it is needed. The goal requires determining likely instructions needed by central processing unit core 110 and calling and storing these instructions in level one instruction cache 121 before a demand fetch for that instruction fetch packet. Prefetch finite state machine 2024 assumes a linear path through the instruction code and prefetches instruction fetch packets on this linear path.

This technique may create problems. One potential problem depends upon the timing of a prefetch and the corresponding demand fetch. It is possible to receive a demand fetch for an instruction packet while a prefetch for the same level one instruction cache 121 cache line is pending. Such a demand fetch would generate a tag miss in level one instruction cache 121. Without checking for this hazard, the cache system would generate a fetch for level two combined instruction/data cache 130 to service this tag miss. This would generate a redundant memory fetch operation and defeat the purpose of the prefetch.

Figure 23:
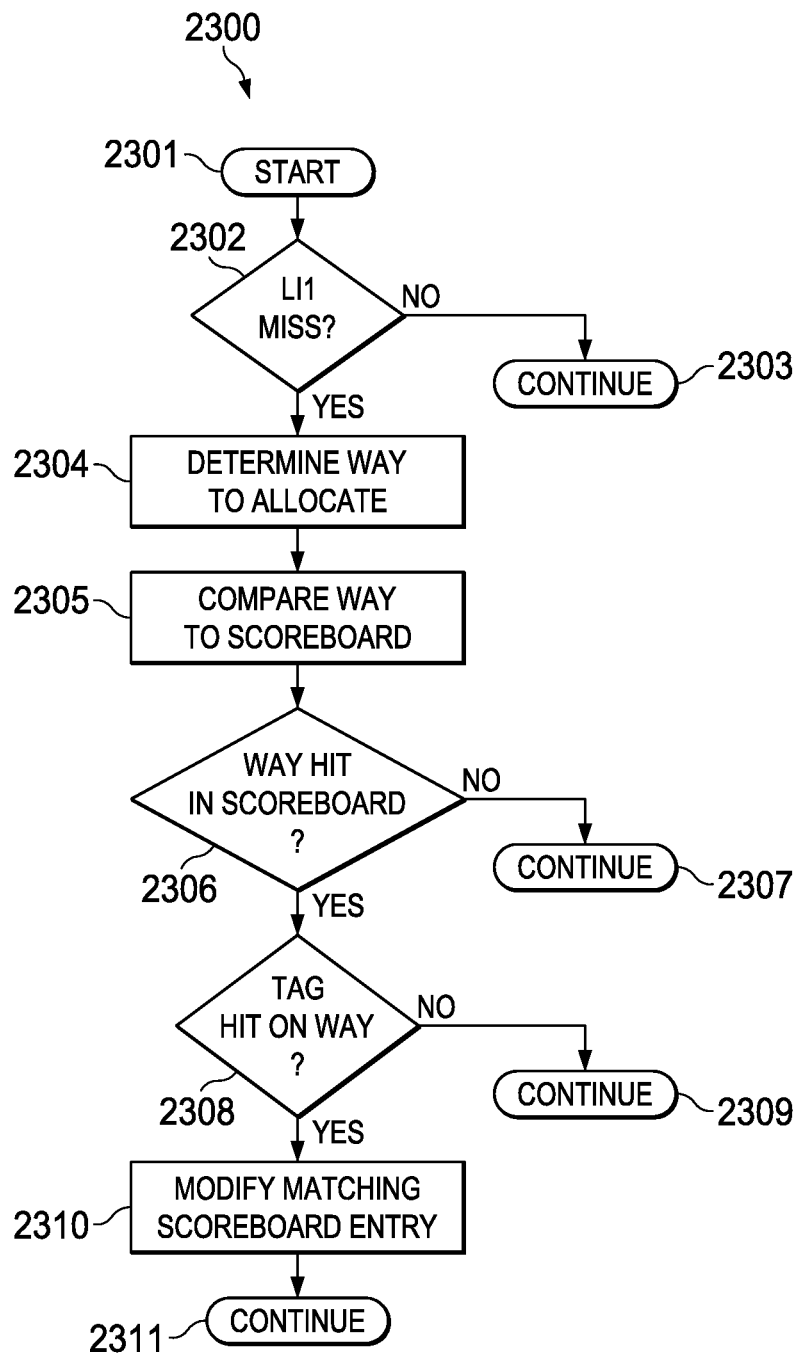
FIG. 23 is a flow chart illustrating operations in accordance with one aspect of this invention.

FIG. 23 is a flow chart of operation 2300 according to this invention. Operation 2300 illustrates only the part of the operation of program memory controller 1930 and unified memory controller 1940 relevant to this invention. Operations relevant to this aspect of the invention begin at start block 2301 upon a central processing unit demand instruction fetch.

Test block 2302 determines if the fetch address of an instruction fetch just submitted for tag match results in a miss within program memory controller 190. If the fetch address was not a miss (No at test block 2302), then this invention is not applicable. Flow proceeds to continue block 2303 to other aspects of the fetch process not relevant to this invention. In this case, if a fetch address is not a miss, then it is a hit. The instructions sought are stored in level one instruction cache 121. This fetch is serviced from level one instruction cache 121.

If the tag compare was a miss (Yes at test block 2302), then block 2304 determines the way allocated to store return data in service of the level one instruction cache 121 miss. Current instructions stored in the allocated way are discarded to make room for the return data. Caches inherently are smaller than the memory they mirror. Accordingly, each storage location within a cache must be capable of storing instructions from plural main memory locations. It is typical in the art for the cache to provide plural locations, called ways, where memory locations which alias to the same cache line can be stored. When a cache line is to be evicted to make room for instructions from the main memory, one cache way is selected to be replaced. A typical technique known in the art selects for replacement the cache way least recently used. Caches are based upon a locality principle; instructions near an address to a recently used instruction are more likely used in the future than more distant instructions. Thus the least recently used cache way (more distant in time) is less likely to be used in the future than a more recently used instruction. Other replacement policies are feasible. The replacement/allocation policy is applied to the current condition of the cache and a way is selected for replacement. This process is known as allocation.

Figure 24:
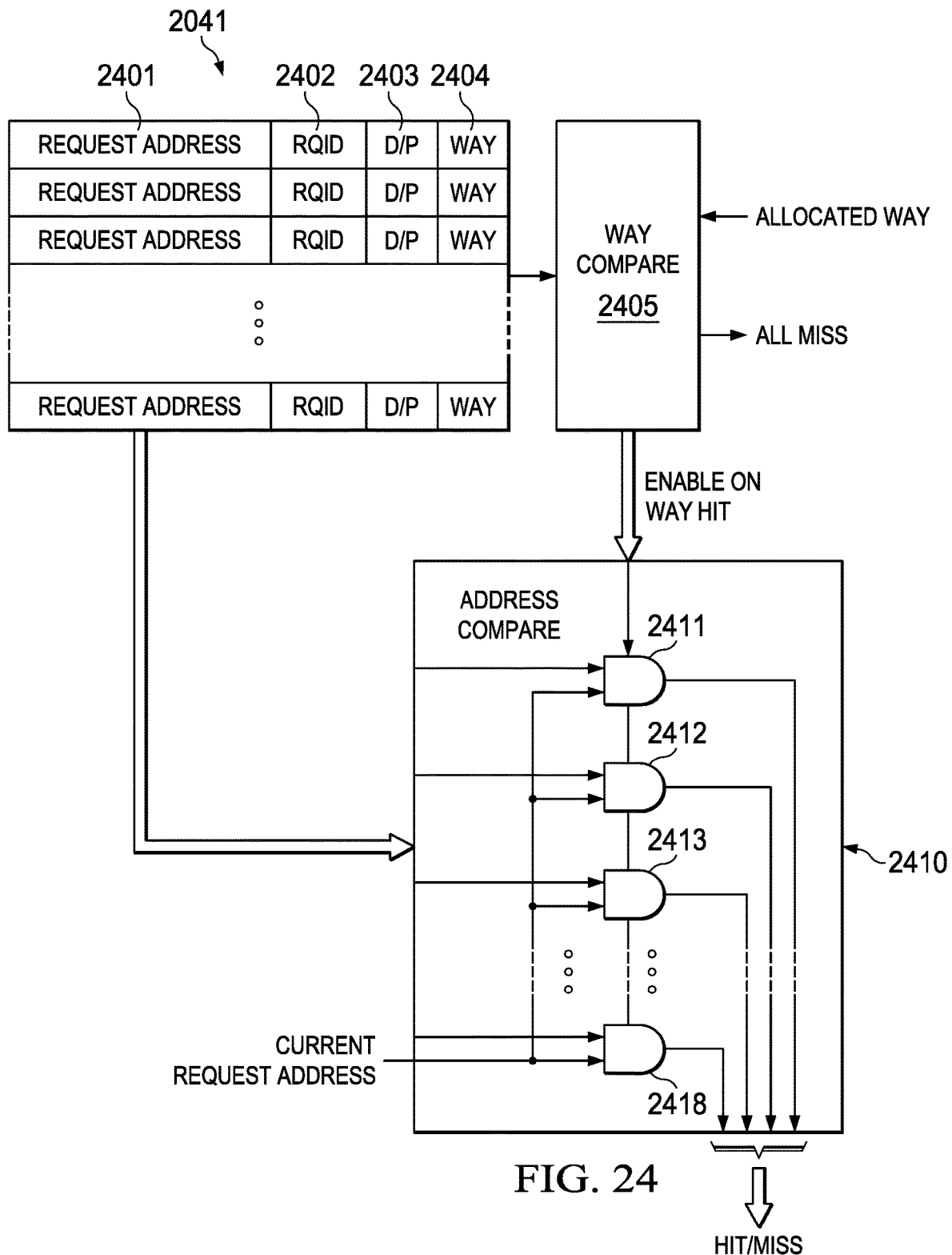
FIG. 24 is a partial schematic drawing illustrating one aspect of this invention.

Block 2305 the compares this way determination with similar way determinations for pending cache service requests in scoreboard 2041. FIG. 24 is a partial schematic diagram illustrating this process. Scoreboard 2041 includes plural entries, one for each pending level one instruction cache service request. This exemplary embodiment includes eight scoreboard 2041 entries. Each entry in scoreboard 2014 includes: a request address 2401; a request identification (RQID) 2402 assigned to each pending service request for tracking; a demand fetch/prefetch (D/P) 2403 indicator for the service request; and the assigned way 2404 for the service request. Way comparator 2405 compares the determined way of the current demand request with the way of each pending request in scoreboard 2041. Under the conditions to which this invention is most applicable (demand fetch for the same instruction fetch packet as a pending prefetch), the determined way of the pending prefetch is very likely the same as the determined way of the current demand fetch.

Test block 2306 determines if the way compare of block 2305 is a hit. If the determined way of the current demand fetch does not match the way of any pending service request (no at test block 2306), then none of the pending service requests of scoreboard 2041 are for the same address as the current demand request. Way comparator 2405 generates an all miss signal. Flow proceeds to continue block 2307 to other aspects of the fetch process not relevant to this invention. In this case, no pending service request corresponds to the current demand request. These instructions are sought by a service request to level two combined instruction/data cache 130.

If the determined way of the current demand fetch matches the way of any pending service request (yes at test block 2306), then test block 2308 determines if any of these way hit scoreboard entries have request addresses that match the request address of the current demand request. In FIG. 24, way comparator 2405 transmits a compare enable signal to address comparator 2406 enabling comparison of the scoreboard entries generating a way hit. Address comparator 2410 includes a number of individual address comparators 2411, 2412, 2413 . . . 2418 equal to the number of entries in scoreboard 2041. Each individual address comparators 2411, 2412, 2413 . . . 2418 has a first input receiving the request address from a corresponding entry in scoreboard 2041 and a second input receiving the current demand request address. Each individual address comparators 2411, 2412, 2413 . . . 2418 is enabled for comparing its inputs upon a corresponding way hit from way comparator 2305. In the preferred embodiment only the active comparators are powered. Other comparators are not powered. Upon a miss (no at test block 2308) indicating that no scoreboard entry matches the request address of the current demand request, then none of the pending service requests of scoreboard 2041 are for the same address as the current demand request. Flow proceeds to continue block 2309 to other aspects of the fetch process not relevant to this invention. In this case, no pending service request corresponds to the current demand request. These instructions are sought in level two combined instruction/data cache 130.

This invention is applicable if a request address of an entry within scoreboard 2041 matches the current demand request address (yes at text block 2308). If this is the case, then block 2310 modifies the matching scoreboard entry to be a demand request. In particular field 2403 is changed to indicate this request is a demand request. As noted in conjunction with FIG. 25, return data in response to a prefetch is handled differently than return data in response to a demand request. No additional level two combined instruction/data cache request is made for the current demand request. Instead the pending prefetch request is converted to a demand request as noted above. Data corresponding to this pending prefetch request will arrive before any data corresponding to the current demand request for the same request address. This effectively services the current demand request with return data from the corresponding prior prefetch.

Upon modifying the request, flow proceeds to continue block 2311 to other aspects of the fetch process not relevant to this invention.

Figure 25:
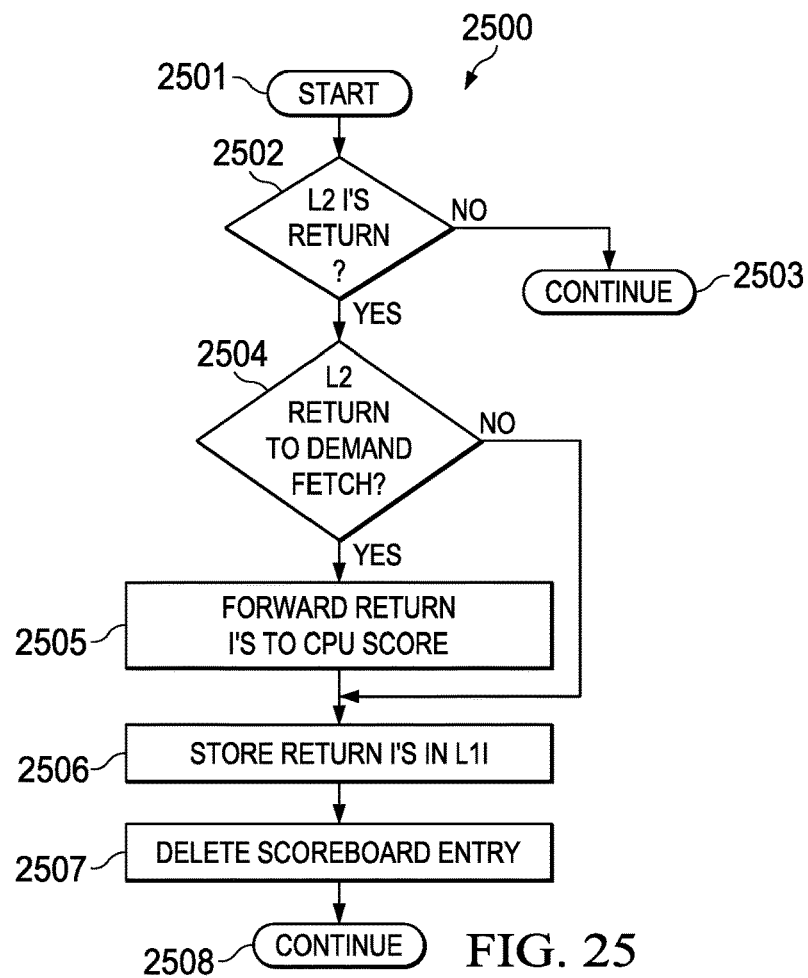
FIG. 25 is a flow chart illustrating operations in accordance with another aspect of this invention.

FIG. 25 is a flow chart 2500 illustrating the response of program memory controller 1930 to a return from unified memory controller 1940. Operation 2500 illustrates only the part of the operation of program memory controller 1930 relevant to this invention. Operations relevant to this aspect of the invention begin at start block 2501.

Test block 2502 determines whether a cache service return is received from unified memory controller 1940. If there is no cache service return (no at test block 2502), then this invention is not applicable. Process 2500 continues with continue block 2503.

Upon receipt of a cache service return from unified memory controller 1940 (yes at test block 2502), test block 2504 determines whether the cache service return is to a demand request. The cache service return preferably includes a request identification. This request identification is employed to determine the matching entry in scoreboard 2041. The identified entry in scoreboard 2041 includes the request address 2401, the request identification 2402, a demand fetch/prefetch 2403 and the assigned way 2404. Program memory controller 1930 determines whether the cache service return is from a demand request or a prefetch by the demand fetch/prefetch of the corresponding scoreboard entry. As noted above, a demand request is issued directly from central processing unit core 110. If this is a demand request return (yes at test block 2504), then block 2505 forwards the returned instructions to central processing unit core 110. Because central processing unit core 110 has directly requested these instructions (demand fetch), central processing unit core 110 is waiting for the instructions. Central processing unit core 110 may even be stalled and not producing results. Thus the cache service return is forwarded directly to central processing unit core 110 with the goal to reduce any stall time. Process 2500 then advances to block 2506.

If this is not a demand request return (no at test block 2504) or if this was a demand request return (yes at test block 2504) following block 2506 suppling demand request returned instructions to central processing unit core 110, then block 2506 stores the returned instructions in level one instruction cache 121. The existence a cache service return from unified memory controller 1940 (test block 2502) implies a cache miss in program memory controller 1930. Thus the returned instruction should be stored in level one instruction 121 whether the triggering event was a demand request or a prefetch request. This storage takes place at the request address and assigned way of the corresponding scoreboard entry.

Block 2507 then deletes the scoreboard entry. Upon handling of the cache service return, this scoreboard entry is no longer useful. This frees the entry for use to track another cache service request. Flow proceeds to continue block 2508 to other processes not relevant to this invention.

This invention detects and corrects a cache hazard. This cache hazard is a demand fetch that causes a cache miss following a prefetch for the same instructions that is still pending. There are several ways to handle this hazard. One technique ignores the hazard and makes a cache service request corresponding to the demand fetch. This technique produces a redundant cache service request. The prefetch obtains the instructions sought and stores them in the level one instruction cache. The demand fetch occurs too early to take advantage of this prefetch. The demand fetch generates a cache miss and another cache service request. The central processing unit core waits for the return in response to the demand request and then proceeds. The return instructions in response to the demand request are written over the identical instructions in response to the demand request. This has the advantage of not needing any special consideration to detect and mitigate the hazard. This has the disadvantage that the prefetch pending upon the demand request is ignored and provides no system advantage. Thus the circuits, power and time used in the prefetch are wasted.

A second possible technique detects and mitigates this hazard. In order to detect this hazard the demand request address is compared with the request address of every pending request entry in the scoreboard. If no match is detected, this hazard does not exist. The cache system proceeds to make a cache service request corresponding to the demand fetch. If a match is detected, the pending prefetch is converted into a demand request and the demand request is dropped. This takes advantage of the prefetch, allowing the return to the prefetch to service the demand request. The return to the pending prefetch will complete before a new demand request to the same instructions. This technique has the disadvantage of requiring many bit compares. In the exemplary embodiment of this application the central processing unit core the instruction address is 48 bits. The cache offset 2101 serves as proxy for the 6 least significant bits. Thus scoreboard 2041 must store 42 address bits for each entry. The cache hazard comparison requires comparison of these 42 address bits for each scoreboard entry. The exemplary embodiment of this application includes eight scoreboard entries, thus requiring 8×42=336 bit compares for each demand request to detect the hazard. This hazard detection could be performed in parallel to the cache tag compare, thus requiring power for hazard detection on every demand request. This hazard detection could be performed only after a demand request cache miss, reducing power consumption for demand cache request hits, but possibly requiring additional time to complete.

This invention detects the cache hazard in a different manner than above. This invention takes advantage of the fact that the demand request and the corresponding pending prefetch are allocated to the same cache way. This invention determines whether any scoreboard entry has the same way allocation as the current demand fetch. The full address compare is performed only for those scoreboard entries having the same allocated way as the demand request. The exemplary embodiment includes four ways. The way comparison requires 2×8=16 bit compares. On average two scoreboard entries will generate way hits ((¼)×8=2). Thus the request address on average compares require 2×42=84 bit compares. The cache hazard detection of this invention requires 16+84=100 bit compares instead of the 336 bit compares of the prior art. This enables considerable power saving when using this invention.

In general this invention is advantageous when:

$$A \times S > W \times S + \frac{1}{W} A \times S$$

where: A is the number of address bits stored in the scoreboard, this being less than the number of central processing unit core address bits by an amount corresponding to the offset size of the level one instruction cache; S is the number of entries in the scoreboard; and W is the number of way bits, where $2^W$ is the number of ways.

This invention has been described in conjunction with a very long instruction word (VLIW) central processing unit core. Those skilled in the art would realize the teachings of this application are equally applicable to a central processing unit core fetching individual instructions that are serviced by a level one instruction cache having a cache line size equal to the length of plural instructions.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A method comprising:
receiving a prefetch request for a set of data by a first cache controller of a first cache level;
generating a service request for the set of data based on the prefetch request;
storing an indication of the service request in a scoreboard memory, wherein the indication specifies that the service request is associated with a prefetch operation;
providing the service request for the set of data to a second cache level;
while the service request is pending:
receiving a demand request for the set of data;
determining whether the demand request is associated with the prefetch request based on the indication in the scoreboard memory; and
based on the demand request being associated with the prefetch request, modifying the indication to specify that the service request is associated with a demand operation;
receiving the set of data in response to the service request; and
providing the set of data in response to the demand request.

2. The method of claim 1 further comprising determining whether the prefetch request misses in the first cache level, wherein the generating of the service request is performed based on the prefetch request missing in the first cache level.

3. The method of claim 1 further comprising determining whether the demand request misses in the first cache level, wherein the determining of whether the demand request is associated with the prefetch request is performed based on the demand request missing in the first cache level.

4. The method of claim 3, wherein the determining of whether the demand request misses in the first cache level includes:
determining a cache way associated with the demand request;
determining whether the cache way hits in the scoreboard memory; and
based on the cache way hitting in the scoreboard memory, determining whether an address associated with the demand request hits in the scoreboard memory.

5. The method of claim 1 further comprising, based on the receiving of the set of data in response to the service request, deleting the indication from the scoreboard memory.

6. The method of claim 1 further comprising invaliding a line of the first cache level allocated to store the set of data after the providing of the service request.

7. The method of claim 1, wherein the indication specifies a way associated with the prefetch request and an address associated with the prefetch request.

8. The method of claim 1, wherein the providing of the set of data provides the set of data to a processor and is performed based on the indication in the scoreboard memory specifying that the service request is associated with a demand operation.

9. The method of claim 1, wherein:
the service request is a first service request; and
the method further comprises determining whether to provide a second service request for the set of data to the second cache level based on the indication in the scoreboard memory such that the second service request is not provided based on the indication specifying that the service request is associated with a prefetch operation.

10. The method of claim 1 further comprising storing the set of data in a cache memory of the first cache level.

11. A device comprising:
a processor core;
a first level cache;
a cache controller coupled to the processor core and to the first level cache and that includes:
a prefetch circuit configured to generate a prefetch request for a set of data; and a scoreboard memory, wherein the cache controller is configured to:
- generate a service request for the set of data based on the prefetch request;
- store an indication of the service request in the scoreboard memory;
- while the service request is pending:
  - receive a demand request for the set of data from the processor core;
  - determine whether the demand request is associated with the prefetch request based on the indication in the scoreboard memory; and
  - based on the demand request being associated with the prefetch request, modify the indication to specify that the service request is associated with a demand operation;
- receive the set of data in response to the service request; and
- provide the set of data to the processor core in response to the demand request.

12. The device of claim 11, wherein:
the cache controller includes:
- a tag memory; and
- a tag compare circuit;

the cache controller is configured to determine whether the prefetch request misses in the first level cache using the tag memory and the tag compare circuit; and
the cache controller is configured to generate the service request based on the prefetch request missing in the first level cache.

13. The device of claim 11, wherein:
the cache controller includes:
- a tag memory; and
- a tag compare circuit;

the cache controller is configured to determine whether the demand request misses in the first level cache using the tag memory and the tag compare circuit; and
the cache controller is configured to determine whether the demand request is associated with the prefetch request based on the demand request missing in the first level cache.

14. The device of claim 13, wherein the cache controller is configured to determine whether the demand request misses in the first level cache by:
- determining a cache way associated with the demand request;
- determining whether the cache way hits in the scoreboard memory; and
- based on the cache way hitting in the scoreboard memory, determining whether an address associated with the demand request hits in the scoreboard memory.

15. The device of claim 11, wherein the cache controller is configured to delete the indication from the scoreboard memory based on receipt of the set of data in response to the service request.

16. The device of claim 11, wherein the cache controller is configured to invalidate a line of the first level cache allocated to store the set of data after the service request is provided.

17. The device of claim 11, wherein the indication specifies a way associated with the prefetch request and an address associated with the prefetch request.

18. The device of claim 11, wherein the cache controller is configured to provide the set of data to the processor core based on the indication in the scoreboard memory specifying that the service request is associated with a demand operation.

19. The device of claim 11, wherein:
the service request is a first service request; and
the cache controller is configured to determine whether to provide a second service request for the set of data based on the indication in the scoreboard memory such that the second service request is not provided when the indication specifies that the service request is associated with a prefetch operation.

20. The device of claim 11, wherein the cache controller is configured to store the set of data in the first level cache.

* * * * *